United States Patent
Kim et al.

(10) Patent No.: US 10,304,009 B1
(45) Date of Patent: May 28, 2019

(54) LEARNING METHOD AND TESTING METHOD FOR OBJECT DETECTOR BASED ON R-CNN, AND LEARNING DEVICE AND TESTING DEVICE USING THE SAME

(71) Applicant: StradVision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/154,026

(22) Filed: Oct. 8, 2018

(51) Int. Cl.
*G06N 20/00* (2019.01)
*G06K 9/32* (2006.01)
*G06N 3/08* (2006.01)

(52) U.S. Cl.
CPC ........... *G06N 20/00* (2019.01); *G06K 9/3233* (2013.01); *G06N 3/08* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 9,830,529 B2* | 11/2017 | Jetley | ................... | G06K 9/4671 |
| 9,858,496 B2* | 1/2018 | Sun | ........................ | G06N 3/084 |
| 9,881,234 B2* | 1/2018 | Huang | ................. | G06K 9/6232 |
| 9,947,103 B1* | 4/2018 | Kim | .......................... | G06T 7/12 |
| 9,965,719 B2* | 5/2018 | Choi | ......................... | G06N 3/08 |
| 9,984,325 B1* | 5/2018 | Kim | ..................... | G06K 9/6274 |
| 10,007,865 B1* | 6/2018 | Kim | ..................... | G06K 9/6231 |
| 10,043,113 B1* | 8/2018 | Kim | ........................ | G06T 7/10 |
| 10,095,977 B1* | 10/2018 | Kim | ..................... | G06N 3/0454 |

(Continued)

*Primary Examiner* — Xuemei G Chen
(74) *Attorney, Agent, or Firm* — Husch Blackwell LLP

(57) ABSTRACT

A method for learning an object detector based on an R-CNN by using a first to an n-th filter blocks respectively generating a first to an n-th feature maps through convolution operations in sequence, and a k-th to a first upsampling blocks respectively coupled with the first to the n-th filter blocks is provided. The method includes steps of: a learning device instructing the k-th upsampling block to the first upsampling block to generate a (k–1)-st pyramidic feature map to the first pyramidic feature map respectively; instructing an RPN to generate each ROI corresponding to each candidate region, and instructing a pooling layer to generate a feature vector; and learning parameters of the FC layer, the k-th to the first upsampling blocks, and the first to the n-th filter blocks by backpropagating a first loss generated by referring to object class information, object regression information, and their corresponding GTs.

30 Claims, 8 Drawing Sheets

(56) References Cited

U.S. PATENT DOCUMENTS

| | | | |
|---|---|---|---|
| 10,169,679 B1* | 1/2019 | Kim | G06K 9/6256 |
| 2017/0011281 A1* | 1/2017 | Dijkman | G06K 9/66 |
| 2018/0039853 A1* | 2/2018 | Liu | G06N 3/0454 |
| 2018/0068198 A1* | 3/2018 | Savvides | G06K 9/3233 |
| 2018/0137642 A1* | 5/2018 | Malisiewicz | G06T 7/11 |
| 2018/0165551 A1* | 6/2018 | Roh | G06K 9/6267 |

* cited by examiner

LEARNING METHOD AND TESTING METHOD FOR OBJECT DETECTOR BASED ON R-CNN, AND LEARNING DEVICE AND TESTING DEVICE USING THE SAME

FIELD OF THE INVENTION

The present invention relates to a method for learning an object detector based on an region-based CNN (R-CNN) by using each of a first filter block to an n-th filter block respectively generating each of a first feature map to an n-th feature map through one or more convolution operations in sequence, and a k-th upsampling block to a first upsampling block respectively coupled with at least part of the first filter block to the n-th filter block; and more particularly to the method including steps of: (a) if at least one training image is acquired, (i) instructing the first filter block to the n-th filter block to apply the convolution operations in sequence to the training image, to thereby generate the first feature map to the n-th feature map which are sequentially downsampled, (ii) instructing the k-th upsampling block to (ii-1) convert the n-th feature map into a k-th up-scaled feature map having a scale identical to that of an (n−1)-st feature map, (ii-2) generate a k-th integrated feature map by calculation using the k-th up-scaled feature map and the (n−1)-st feature map and (ii-3) input the k-th integrated feature map into the (k−1)-st upsampling block, and (ii-4) generate a k-th pyramidic feature map by using the k-th integrated feature map, and (iii) instructing a j-th upsampling block to (iii-1) convert a (j+1)-st integrated feature map into a j-th up-scaled feature map having a scale identical to that of a (j+1)-st feature map, (iii-2) generate a j-th integrated feature map by calculation using the j-th up-scaled feature map and the (j+1)-st feature map, (iii-3) input the j-th integrated feature map into a (j−1)-st upsampling block, and (iii-4) generate a j-th pyramidic feature map by using the j-th integrated feature map, and (iv) repeating the processes of (ii) and (iii) until the first upsampling block generates the first pyramidic feature map, resulting in the generation of a (k−1)-st pyramidic feature map to the first pyramidic feature map, wherein the j is an integer less than the k; (b) instructing an RPN to generate each region of interest (ROI) corresponding to each candidate region estimated as including at least one object on each of at least two pyramidic feature maps among the k-th pyramidic feature map to the first pyramidic feature map, and instructing a pooling layer to generate at least one feature vector by applying a pooling operation to each region, on the at least two pyramidic feature maps, corresponding to said each ROI; and (c) instructing at least one FC layer to generate each piece of object class information and each piece of object regression information corresponding to said each ROI by using the feature vector, and instructing a first loss layer to generate at least one first loss by referring to each piece of the object class information, each piece of the object regression information, and each of their corresponding first ground truths (GTs), to thereby learn at least part of parameters of the FC layer, the k-th upsampling block to the first upsampling block, and the first filter block to the n-th filter block by backpropagating the first loss, and a learning device, a testing method, and a testing device using the same.

BACKGROUND OF THE INVENTION

In machine learning, a convolutional neural network (CNN, or ConvNet) is a class of deep, feed-forward artificial neural network that has successfully been applied to analyzing visual imagery.

FIG. 1 is a drawing schematically illustrating a testing method of an object detector by using a conventional R-CNN.

First, a testing device as illustrated in FIG. 1 may acquire an RGB image 101 as an input to be fed into one or more convolutional layers 102, i.e., convolutional filters, included in a convolution block. As the RGB image passes through the convolutional layers, a size, e.g., width and height, of the RGB image becomes smaller in its width and its height while the number of channels is increased.

Next, the testing device may pass a feature map 103 through a learned RPN (Region Proposal Network), to thereby generate an ROI 105, and may instruct a pooling layer 106 to resize a pixel data included in regions corresponding to the ROI 105 on the feature map by applying one of a max pooling operation or an average pooling operation to the regions, to resize the pixel data and generate a feature vector by referring to the resized feature map.

Then, the testing device may input the feature vector into a learned FC (Fully Connected) layer 108 to determine types of objects on the inputted RGB image by classification operation, etc., and may generate a bounding box on the inputted RGB image by using the FC layer.

However, a method for detecting the object by using a conventional R-CNN has a shortcoming that a bounding box corresponding to the object cannot be generated. Since a smallest sized feature map generated as a result of applying convolution operations multiple times to the image is generally used, it is insufficient to express the object with the smallest sized feature map.

Accordingly, the inventor of the present invention proposes a learning method, a learning device for generating a bounding box with high precision from a plurality of multi-scaled feature maps. Further, a testing method and a testing device using the same are disclosed herein as well.

SUMMARY OF THE INVENTION

It is an object of the present invention to solve all the aforementioned problems.

It is another object of the present invention to provide an object detector based on an R-CNN with improved function of detecting an object having small pixel data.

It is still another object of the present invention to provide the object detector based on the R-CNN capable of detecting small objects in an image without additional computational load.

In accordance with one aspect of the present invention, there is provided a method for learning an object detector based on an R-CNN by using each of a first filter block to an n-th filter block respectively generating each of a first feature map to an n-th feature map through one or more convolution operations in sequence, and a k-th upsampling block to a first upsampling block respectively coupled with at least part of the first filter block to the n-th filter block, including steps of: (a) a learning device, if at least one training image is acquired, (i) instructing the first filter block to the n-th filter block to apply the convolution operations in sequence to the training image, to thereby generate the first feature map to the n-th feature map which are sequentially downsampled, (ii) instructing the k-th upsampling block to (ii-1) convert the n-th feature map into a k-th up-scaled feature map having a scale identical to that of an (n−1)-st feature map, (ii-2) generate a k-th integrated feature map by calculation using the k-th up-scaled feature map and the (n−1)-st feature map and (ii-3) input the k-th integrated feature map into the (k−1)-st upsampling block, and (ii-4)

generate a k-th pyramidic feature map by using the k-th integrated feature map, and (iii) instructing a j-th upsampling block to (iii-1) convert a (j+1)-st integrated feature map into a j-th up-scaled feature map having a scale identical to that of a (j+1)-st feature map, (iii-2) generate a j-th integrated feature map by calculation using the j-th up-scaled feature map and the (j+1)-st feature map, (iii-3) input the j-th integrated feature map into a (j−1)-st upsampling block, and (iii-4) generate a j-th pyramidic feature map by using the j-th integrated feature map, and (iv) repeating the processes of (ii) and (iii) until the first upsampling block generates the first pyramidic feature map, resulting in the generation of a (k−1)-st pyramidic feature map to the first pyramidic feature map, wherein the j is an integer less than the k; (b) the learning device instructing an RPN to generate each ROI corresponding to each candidate region estimated as including at least one object on each of at least two pyramidic feature maps among the k-th pyramidic feature map to the first pyramidic feature map, and instructing a pooling layer to generate at least one feature vector by applying a pooling operation to each region, on the at least two pyramidic feature maps, corresponding to said each ROI; and (c) the learning device instructing at least one FC layer to generate each piece of object class information and each piece of object regression information corresponding to said each ROI by using the feature vector, and instructing a first loss layer to generate at least one first loss by referring to each piece of the object class information, each piece of the object regression information, and each of their corresponding first ground truths, to thereby learn at least part of parameters of the FC layer, the k-th upsampling block to the first upsampling block, and the first filter block to the n-th filter block by backpropagating the first loss.

As one example, each of the k-th upsampling block to the first upsampling block (i) respectively instructs each of a (1−k)-th sub filter layer therein to a (1−1)-st sub filter layer therein to adjust each channel depth of each lower-scaled feature map to be equal to that of each upper-scaled feature map, and (ii) respectively instructs each of a (1−k)-th feature upsampling layer therein to a (1−1)-st feature upsampling layer therein respectively corresponding to the (1−k)-th sub filter layer to the (1−1)-st sub filter layer to upsample said each lower-scaled feature map, to thereby allow a size of said each lower-scaled feature map to be equal to that of said each upper-scaled feature map.

As one example, each of the k-th upsampling block to the first upsampling block (i) respectively instructs each of a (2−k)-th sub filter layer therein to a (2−1)-st sub filter layer therein to apply the convolution operations to the integrated feature maps to thereby generate revised integrated feature maps in order to refine each feature on the integrated feature maps by using features within a certain distance from said each feature on the integrated feature maps, and (ii) respectively instructs each of a (3−k)-th sub filter layer therein to a (3−1)-st sub filter layer therein to apply the convolution operations to the revised integrated feature maps in order to refine each feature on the revised integrated feature maps by using features in a direction of the channel depth, to thereby generate the pyramidic feature maps.

As one example, at the step of (b), the RPN (i) instructs its convolutional layers each of which corresponds to the at least two pyramidic feature maps to apply the convolution operations to their corresponding pyramidic feature maps, to thereby generate each piece of ROI class information and each piece of ROI regression information of each of ROI candidates corresponding to each of candidate regions estimated as including the object on the pyramidic feature maps, and (ii) instructs a proposal layer to generate said each ROI by selecting at least one specific ROI candidate having at least one high probability of including the object among the ROI candidates.

As one example, the learning device instructs at least one second loss layer corresponding to the RPN to generate at least one second loss by referring to the ROI regression information, the ROI class information, and their corresponding one or more second GTs, to thereby learn parameters of the RPN by backpropagating the second loss.

As one example, at the step of (b), when the proposal layer selects the at least one specific ROI candidate among at least part of the ROI candidates corresponding to larger-scaled pyramidic feature maps and at least part of the ROI candidates corresponding to smaller-scaled pyramidic feature maps, the number of pieces of data on pixels included in the at least part of the ROI candidates corresponding to the smaller-scaled pyramidic feature maps is equal to or greater than the number of pieces of data on pixels included in the at least part of the ROI candidates corresponding to the larger-scaled pyramidic feature maps.

As one example, at the step of (b), the pooling layer generates each of pooled feature maps by applying a pooling operation to each region corresponding to said each ROI on each of the pyramidic feature maps, and generates the feature vector by concatenating the pooled feature maps.

As one example, at the step of (a), the learning device generates the k-th integrated feature map by an element-wise operation of the k-th up-scaled feature map and the (n−1)-st feature map, and generates the j-th integrated feature map by the element-wise operation of the j-th up-scaled feature map and the (j+1)-st feature map.

In accordance with another aspect of the present invention, there is provided a method for testing an object detector based on an R-CNN by using each of a first filter block to an n-th filter block respectively generating each of a first feature map for testing to an n-th feature map for testing through one or more convolution operations in sequence, and a k-th upsampling block to a first upsampling block respectively coupled with at least part of the first filter block to the n-th filter block, including steps of: (a) a testing device, on condition that a learning device (i) has instructed the first filter block to the n-th filter block to apply the convolution operations in sequence to at least one training image, to thereby generate a first feature map for training to an n-th feature map for training which are sequentially downsampled; (ii) (ii-1) has instructed the k-th upsampling block to convert the n-th feature map for training into a k-th up-scaled feature map for training having a scale identical to that of an (n−1)-st feature map for training, (ii-2) has generated a k-th integrated feature map for training by calculation using the k-th up-scaled feature map for training and the (n−1)-st feature map for training and (ii-3) has inputted the k-th integrated feature map for training into the (k−1)-st upsampling block, and (ii-4) has generated a k-th pyramidic feature map for training by using the k-th integrated feature map for training; (iii) has instructed a j-th upsampling block to (iii-1) convert a (j+1)-st integrated feature map for training into a j-th up-scaled feature map for training having a scale identical to that of a (j+1)-st feature map for training, (iii-2) generate a j-th integrated feature map for training by calculation using the j-th up-scaled feature map for training and the (j+1)-st feature map for training, (iii-3) input the j-th integrated feature map for training into a (j−1)-st upsampling block, and (iii-4) generate a j-th pyramidic feature map for training by using the j-th integrated feature map for training; (iv) has repeated the processes of (ii) and (iii) until the first upsampling block has generated the first pyramidic feature map for training, resulting in the generation of a (k−1)-st pyramidic feature map for training to the first pyramidic feature map for training, wherein the j is an integer less than the k; (v) has instructed the RPN to generate each ROI for training corresponding to each candidate region estimated as including at least one object for training on each of at least two pyramidic feature maps for training among the k-th pyramidic feature map for training to the first pyramidic feature map for training; (vi) has instructed at least one pooling layer to generate at least one feature vector for training by applying at least one pooling operation to each region, on the at least two pyramidic feature maps for training, corresponding to said each ROI for training; (vii) has instructed at least one FC layer to generate each piece of object class information for training and each piece of object regression information for training corresponding to said each ROI for training by using the feature vector for training; and (viii) has instructed at least one first loss layer to generate at least one first loss by referring to each piece of the object class information for training, each piece of the object regression information for training, and each of their corresponding first ground truths, to thereby learn at least part of the parameters of the FC layer, the k-th upsampling block to the first upsampling block, and the first filter block to the n-th filter block by backpropagating the first loss; then, if at least one test image is inputted, (I) instructing the first filter block to the n-th filter block to apply the convolution operations in sequence to the test image, to thereby generate the first feature map for testing to the n-th feature map for testing which are sequentially downsampled, (II) (II-1) instructing the k-th upsampling block to convert the n-th feature map for testing into a k-th up-scaled feature map for testing having a scale identical to that of an (n−1)-st feature map for testing, (II-2) generating a k-th integrated feature map for testing by calculation using the k-th up-scaled feature map for testing and the (n−1)-st feature map for testing and (II-3) inputting the k-th integrated feature map for testing into the (k−1)-st upsampling block, and (II-4) generating a k-th pyramidic feature map for testing by using the k-th integrated feature map for testing, and (III) instructing a j-th upsampling block to (III-1) convert a (j+1)-st integrated feature map for testing into a j-th up-scaled feature map for testing having a scale identical to that of a (j+1)-st feature map for testing, (III-2) generating a j-th integrated feature map for testing by calculation using the j-th up-scaled feature map for testing and the (j+1)-st feature map for testing, (III-3) inputting the j-th integrated feature map for testing into the (j−1)-st upsampling block, and (III-4) generating a j-th pyramidic feature map for testing by using the j-th integrated feature map for testing, and (IV) repeating the processes of (II) and (III) until the first upsampling block completes generation of the first pyramidic feature map for testing, resulting in generation of a (k−1)-st pyramidic feature map for testing to the first pyramidic feature map for testing; (b) the testing device instructing the RPN to generate each ROI for testing corresponding to each candidate region estimated as including at least one object for testing on each of at least two pyramidic feature maps for testing among the k-th pyramidic feature map for testing to the first pyramidic feature map for testing, and instructing the pooling layer to generate at least one feature vector for testing by applying the pooling operation to each region, on the at least two pyramidic feature maps for testing, corresponding to said each ROI for testing; and (c) the testing device instructing the FC layer to generate object regression information for testing and object class information for testing corresponding to said each ROI for testing by using the feature vector for testing.

As one example, each of the k-th upsampling block to the first upsampling block (i) respectively instructs each of a (1−k)-th sub filter layer therein to a (1−1)-st sub filter layer therein to adjust each channel depth of each lower-scaled feature map for testing to be equal to that of each upper-scaled feature map for testing, and (ii) respectively instructs each of a (1−k)-th feature upsampling layer therein to a (1−1)-st feature upsampling layer therein respectively corresponding to the (1−k)-th sub filter layer to the (1−1)-st sub filter layer to upsample said each lower-scaled feature map for testing, to thereby allow a size of said each lower-scaled feature map for testing to be equal to that of said each upper-scaled feature map for testing.

As one example, each of the k-th upsampling block to the first upsampling block (i) respectively instructs each of a (2−k)-th sub filter layer therein to a (2−1)-st sub filter layer therein to apply the convolution operations to the integrated feature maps for testing to thereby generate revised integrated feature maps for testing in order to refine each feature on the integrated feature maps for testing by using features within a certain distance from said each feature on the integrated feature maps for testing, and (ii) respectively instructs each of a (3−k)-th sub filter layer therein to a (3−1)-st sub filter layer therein to apply the convolution operations to the revised integrated feature maps for testing in order to refine each feature on the revised integrated feature maps for testing by using features in a direction of the channel depth, to thereby generate the pyramidic feature maps for testing.

As one example, at the step of (b), the RPN (i) instructs its convolutional layers each of which corresponds to the at least two pyramidic feature maps for testing to apply the convolution operations to their corresponding pyramidic feature maps for testing, to thereby generate each piece of ROI class information for testing and each piece of ROI regression information for testing of each of ROI candidates for testing corresponding to each of candidate regions estimated as including the object for testing on the pyramidic feature maps for testing, and (ii) instructs a proposal layer to generate said each ROI for testing by selecting at least one specific ROI candidate for testing having at least one high probability of including the object for testing among the ROI candidates for testing.

As one example, the RPN of the learning device has instructed its corresponding at least one second loss layer to generate at least one second loss by referring to the ROI regression information for training, the ROI class information for training, and their corresponding one or more second GTs, to thereby learn parameters of the RPN of the learning device by backpropagating the second loss.

As one example, at the step of (b), the pooling layer generates each of pooled feature maps for testing by applying the pooling operation to each region corresponding to said each ROI for testing on each of the pyramidic feature maps for testing, and generates the feature vector for testing by concatenating the pooled feature maps for testing.

As one example, at the step of (a), the testing device generates the k-th integrated feature map for testing by an element-wise operation of the k-th up-scaled feature map for testing and the (n−1)-st feature map for testing, and generates the j-th integrated feature map for testing by the element-wise operation of the j-th up-scaled feature map for testing and the (j+1)-st feature map for testing.

In accordance with still another aspect of the present invention, there is provided a learning device for learning an object detector based on an R-CNN by using each of a first filter block to an n-th filter block respectively generating each of a first feature map to an n-th feature map through one or more convolution operations in sequence, and a k-th upsampling block to a first upsampling block respectively coupled with at least part of the first filter block to the n-th filter block, including: a communication part for acquiring at least one training image; and a processor for performing processes of (I) instructing the first filter block to the n-th filter block to apply the convolution operations in sequence to the training image, to thereby generate the first feature map to the n-th feature map which are sequentially downsampled, (II) instructing the k-th upsampling block to (II-1) convert the n-th feature map into a k-th up-scaled feature map having a scale identical to that of an (n−1)-st feature map, (II-2) generate a k-th integrated feature map by calculation using the k-th up-scaled feature map and the (n−1)-st feature map and (II-3) input the k-th integrated feature map into the (k−1)-st upsampling block, and (II-4) generate a k-th pyramidic feature map by using the k-th integrated feature map, and (III) instructing a j-th upsampling block to (III-1) convert a (j+1)-st integrated feature map into a j-th up-scaled feature map having a scale identical to that of a (j+1)-st feature map, (III-2) generate a j-th integrated feature map by calculation using the j-th up-scaled feature map and the (j+1)-st feature map, (III-3) input the j-th integrated feature map into a (j−1)-st upsampling block, and (III-4) generate a j-th pyramidic feature map by using the j-th integrated feature map, (IV) repeating the processes of (II) and (III) until the first upsampling block generates the first pyramidic feature map, resulting in the generation of a (k−1)-st pyramidic feature map to the first pyramidic feature map, wherein the j is an integer less than the k, (V) instructing an RPN to generate each ROI corresponding to each candidate region estimated as including at least one object on each of at least two pyramidic feature maps among the k-th pyramidic feature map to the first pyramidic feature map, and instructing a pooling layer to generate at least one feature vector by applying a pooling operation to each region, on the at least two pyramidic feature maps, corresponding to said each ROI, and (VI) instructing at least one FC layer to generate each piece of object class information and each piece of object regression information corresponding to said each ROI by using the feature vector, and instructing a first loss layer to generate at least one first loss by referring to each piece of the object class information, each piece of the object regression information, and each of their corresponding first ground truths, to thereby learn at least part of parameters of the FC layer, the k-th upsampling block to the first upsampling block, and the first filter block to the n-th filter block by backpropagating the first loss.

As one example, each of the k-th upsampling block to the first upsampling block (i) respectively instructs each of a (1−k)-th sub filter layer therein to a (1−1)-st sub filter layer therein to adjust each channel depth of each lower-scaled feature map to be equal to that of each upper-scaled feature map, and (ii) respectively instructs each of a (1−k)-th feature upsampling layer therein to a (1−1)-st feature upsampling layer therein respectively corresponding to the (1−k)-th sub filter layer to the (1−1)-st sub filter layer to upsample said each lower-scaled feature map, to thereby allow a size of said each lower-scaled feature map to be equal to that of said each upper-scaled feature map.

As one example, each of the k-th upsampling block to the first upsampling block (i) respectively instructs each of a (2−k)-th sub filter layer therein to a (2−1)-st sub filter layer therein to apply the convolution operations to the integrated feature maps to thereby generate revised integrated feature maps in order to refine each feature on the integrated feature maps by using features within a certain distance from said each feature on the integrated feature maps, and (ii) respectively instructs each of a (3−k)-th sub filter layer therein to a (3−1)-st sub filter layer therein to apply the convolution operations to the revised integrated feature maps in order to refine each feature on the revised integrated feature maps by using features in a direction of the channel depth, to thereby generate the pyramidic feature maps.

As one example, at the process of (V), the RPN (i) instructs its convolutional layers each of which corresponds to the at least two pyramidic feature maps to apply the convolution operations to their corresponding pyramidic feature maps, to thereby generate each piece of ROI class information and each piece of ROI regression information of each of ROI candidates corresponding to each of candidate regions estimated as including the object on the pyramidic feature maps, and (ii) instructs a proposal layer to generate said each ROI by selecting at least one specific ROI candidate having at least one high probability of including the object among the ROI candidates.

As one example, the processor instructs at least one second loss layer corresponding to the RPN to generate at least one second loss by referring to the ROI regression information, the ROI class information, and their corresponding one or more second GTs, to thereby learn parameters of the RPN by backpropagating the second loss.

As one example, at the process of (V), when the proposal layer selects the at least one specific ROI candidate among at least part of the ROI candidates corresponding to larger-scaled pyramidic feature maps and at least part of the ROI candidates corresponding to smaller-scaled pyramidic feature maps, the number of pieces of data on pixels included in the at least part of the ROI candidates corresponding to the smaller-scaled pyramidic feature maps is equal to or greater than the number of pieces of data on pixels included in the at least part of the ROI candidates corresponding to the larger-scaled pyramidic feature maps.

As one example, at the process of (V), the pooling layer generates each of pooled feature maps by applying a pooling operation to each region corresponding to said each ROI on each of the pyramidic feature maps, and generates the feature vector by concatenating the pooled feature maps.

As one example, at the processes of (II) to (III), the processor generates the k-th integrated feature map by an element-wise operation of the k-th up-scaled feature map and the (n−1)-st feature map, and generates the j-th integrated feature map by the element-wise operation of the j-th up-scaled feature map and the (j+1)-st feature map.

In accordance with still yet another aspect of the present invention, there is provided a testing device for testing an object detector based on an R-CNN by using each of a first filter block to an n-th filter block respectively generating each of a first feature map for testing to an n-th feature map for testing through one or more convolution operations in sequence, and a k-th upsampling block to a first upsampling block respectively coupled with at least part of the first filter block to the n-th filter block, including: a communication part for acquiring at least one test image, on condition that a learning device (i) has instructed the first filter block to the n-th filter block to apply the convolution operations in sequence to at least one training image, to thereby generate a first feature map for training to an n-th feature map for training which are sequentially downsampled; (ii) (ii-1) has instructed the k-th upsampling block to convert the n-th feature map for training into a k-th up-scaled feature map for training having a scale identical to that of an (n−1)-st feature map for training, (ii-2) has generated a k-th integrated feature map for training by calculation using the k-th up-scaled feature map for training and the (n−1)-st feature map for training and (ii-3) has inputted the k-th integrated feature map for training into the (k−1)-st upsampling block, and (ii-4) has generated a k-th pyramidic feature map for training by using the k-th integrated feature map for training; (iii) has instructed a j-th upsampling block to (iii-1) convert a (j+1)-st integrated feature map for training into a j-th up-scaled feature map for training having a scale identical to that of a (j+1)-st feature map for training, (iii-2) generate a j-th integrated feature map for training by calculation using the j-th up-scaled feature map for training and the (j+1)-st feature map for training, (iii-3) input the j-th integrated feature map for training into a (j−1)-st upsampling block, and (iii-4) generate a j-th pyramidic feature map for training by using the j-th integrated feature map for training; (iv) has repeated the processes of (ii) and (iii) until the first upsampling block has generated the first pyramidic feature map for training, resulting in the generation of a (k−1)-st pyramidic feature map for training to the first pyramidic feature map for training, wherein the j is an integer less than the k; (v) has instructed the RPN to generate each ROI for training corresponding to each candidate region estimated as including at least one object for training on each of at least two pyramidic feature maps for training among the k-th pyramidic feature map for training to the first pyramidic feature map for training; (vi) has instructed at least one pooling layer to generate at least one feature vector for training by applying at least one pooling operation to each region, on the at least two pyramidic feature maps for training, corresponding to said each ROI for training; (vii) has instructed at least one FC layer to generate each piece of object class information for training and each piece of object regression information for training corresponding to said each ROI for training by using the feature vector for training; and (viii) has instructed at least one first loss layer to generate at least one first loss by referring to each piece of the object class information for training, each piece of the object regression information for training, and each of their corresponding first ground truths, to thereby learn at least part of the parameters of the FC layer, the k-th upsampling block to the first upsampling block, and the first filter block to the n-th filter block by backpropagating the first loss; and a processor for performing processes of (I) instructing the first filter block to the n-th filter block to apply the convolution operations in sequence to the test image, to thereby generate the first feature map for testing to the n-th feature map for testing which are sequentially downsampled, (II) (II-1) instructing the k-th upsampling block to convert the n-th feature map for testing into a k-th up-scaled feature map for testing having a scale identical to that of an (n−1)-st feature map for testing, (II-2) generating a k-th integrated feature map for testing by calculation using the k-th up-scaled feature map for testing and the (n−1)-st feature map for testing and (II-3) inputting the k-th integrated feature map for testing into the (k−1)-st upsampling block, and (II-4) generating a k-th pyramidic feature map for testing by using the k-th integrated feature map for testing, and (III) instructing a j-th upsampling block to (III-1) convert a (j+1)-st integrated feature, map for testing into a j-th up-scaled feature map for testing having a scale identical to that of a (j+1)-st feature map for testing, (III-2) generating a j-th integrated feature map for testing by calculation using the j-th up-scaled feature map for testing and the (j+1)-st feature map for testing, (III-3) inputting the j-th integrated feature map for testing into the (j−1)-st upsampling block, and (III-4) generating a j-th pyramidic feature map for testing by using the j-th integrated feature map for testing, (IV) repeating the processes of (II) and (III) until the first upsampling block completes generation of the first pyramidic feature map for testing, resulting in generation of a (k−1)-st pyramidic feature map for testing to the first pyramidic feature map for testing, (V) instructing the RPN to generate each ROI for testing corresponding to each candidate region estimated as including at least one object for testing on each of at least two pyramidic feature maps for testing among the k-th pyramidic feature map for testing to the first pyramidic feature map for testing, and instructing the pooling layer to generate at least one feature vector for testing by applying the pooling operation to each region, on the at least two pyramidic feature maps for testing, corresponding to said each ROI for testing, and (VI) instructing the FC layer to generate object regression information for testing and object class information for testing corresponding to said each ROI for testing by using the feature vector for testing.

As one example, each of the k-th upsampling block to the first upsampling block (i) respectively instructs each of a (1-k)-th sub filter layer therein to a (1−1)-st sub filter layer therein to adjust each channel depth of each lower-scaled feature map for testing to be equal to that of each upper-scaled feature map for testing, and (ii) respectively instructs each of a (1−k)-th feature upsampling layer therein to a (1−1)-st feature upsampling layer therein respectively corresponding to the (1−k)-th sub filter layer to the (1−1)-st sub filter layer to upsample said each lower-scaled feature map for testing, to thereby allow a size of said each lower-scaled feature map for testing to be equal to that of said each upper-scaled feature map for testing.

As one example, each of the k-th upsampling block to the first upsampling block (i) respectively instructs each of a (2−k)-th sub filter layer therein to a (2−1)-st sub filter layer therein to apply the convolution operations to the integrated feature maps for testing to thereby generate revised integrated feature maps for testing in order to refine each feature on the integrated feature maps for testing by using features within a certain distance from said each feature on the integrated feature maps for testing, and (ii) respectively instructs each of a (3−k)-th sub filter layer therein to a (3−1)-st sub filter layer therein to apply the convolution operations to the revised integrated feature maps for testing in order to refine each feature on the revised integrated feature maps for testing by using features in a direction of the channel depth, to thereby generate the pyramidic feature maps for testing.

As one example, at the process of (V), the RPN (i) instructs its convolutional layers each of which corresponds to the at least two pyramidic feature maps for testing to apply the convolution operations to their corresponding pyramidic feature maps for testing, to thereby generate each piece of ROI class information for testing and each piece of ROI regression information for testing of each of ROI candidates for testing corresponding to each of candidate regions estimated as including the object for testing on the pyramidic feature maps for testing, and (ii) instructs a proposal layer to generate said each ROI for testing by selecting at least one specific ROI candidate for testing having at least one high probability of including the object for testing among the ROI candidates for testing.

As one example, the RPN of the learning device has instructed its corresponding at least one second loss layer to generate at least one second loss by referring to the ROI regression information for training, the ROI class information for training, and their corresponding one or more second GTs, to thereby learn parameters of the RPN of the learning device by backpropagating the second loss.

As one example, at the process of (V), the pooling layer generates each of pooled feature maps for testing by applying the pooling operation to each region corresponding to said each ROI for testing on each of the pyramidic feature maps for testing, and generates the feature vector for testing by concatenating the pooled feature maps for testing.

As one example, at the processes of (II) to (III), the processor generates the k-th integrated feature map for testing by an element-wise operation of the k-th up-scaled feature map for testing and the (n−1)-st feature map for testing, and generates the j-th integrated feature map for testing by the element-wise operation of the j-th up-scaled feature map for testing and the (j+1)-st feature map for testing.

In addition, recordable media that are readable by a computer for storing a computer program to execute the method of the present invention is further provided.

BRIEF DESCRIPTION OF THE DRAWINGS

The above and other objects and features of the present invention will become apparent from the following description of preferred embodiments given in conjunction with the accompanying drawings.

The following drawings to be used to explain example embodiments of the present invention are only part of example embodiments of the present invention and other drawings can be obtained based on the drawings by those skilled in the art of the present invention without inventive work.

DETAILED DESCRIPTION OF THE PREFERRED EMBODIMENTS

Figure 1:
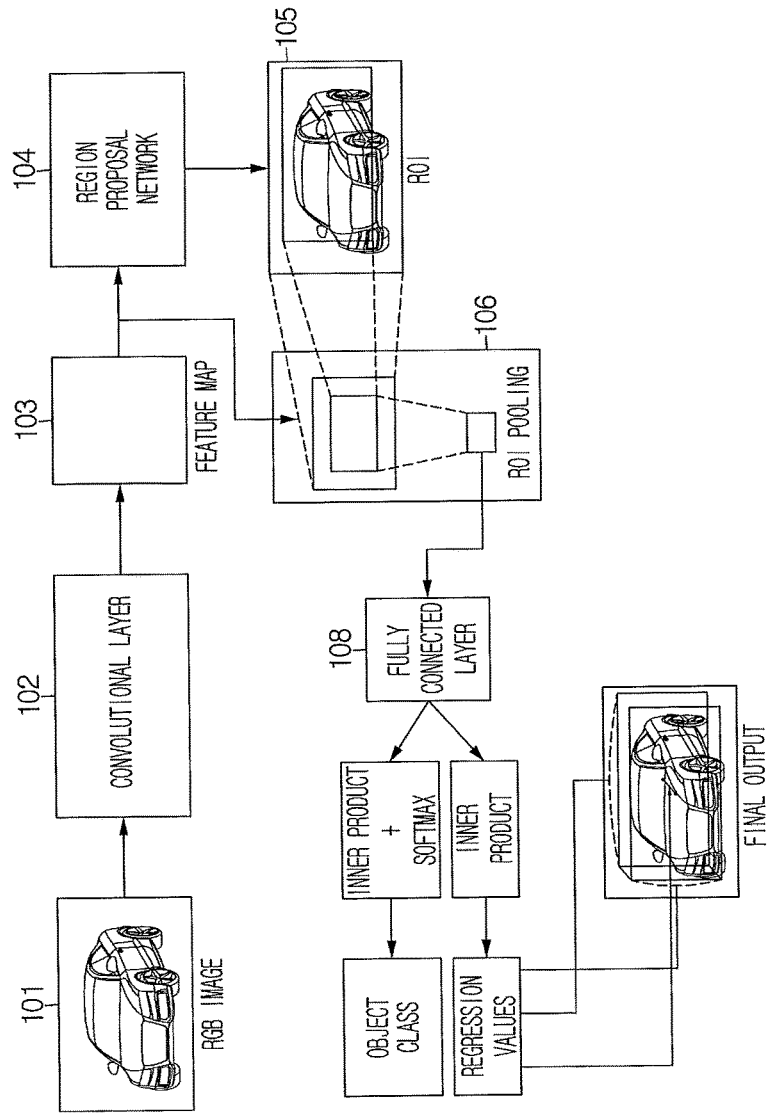
FIG. 1 is a drawing schematically illustrating a testing device of an object detector based on a conventional R-CNN.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 2:
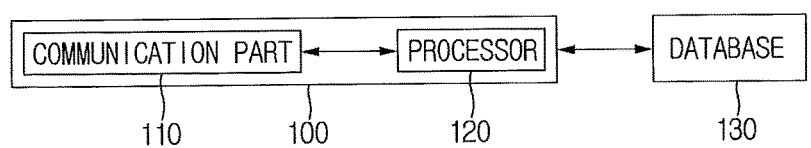
FIG. 2 is a drawing schematically illustrating a learning device for learning the object detector based on an R-CNN in accordance with one example embodiment of the present invention.

FIG. 2 is a drawing schematically illustrating a learning device 100 of an object detector based on an R-CNN in accordance with one example embodiment of the present invention, and by referring to FIG. 2, the learning device 100 may include a communication part 110 and a processor 120.

First, the communication part 110 may acquire or support another device to acquire at least one training image.

Herein, the training image may be stored in a database 130, and the database 130 may store at least one ground truth of class information and location information on each of one or more objects corresponding to the training images.

Then, the processor 120 may instruct a first filter block to an n-th filter block to apply one or more convolution operations in sequence to the training image, to thereby generate a first feature map to an n-th feature map which are sequentially downsampled. Then, the processor 120 may (i) instruct a k-th upsampling block to (i-1) convert the n-th feature map into a k-th up-scaled feature map having a scale identical to that of an (n−1)-st feature map, (i-2) generate a k-th integrated feature map by calculation using the k-th up-scaled feature map and the (n−1)-st feature map, (i-3) input the k-th integrated feature map into the (k−1)-st upsampling block, and (i-4) generate a k-th pyramidic feature map by using the k-th integrated feature map, and (ii) instruct a j-th upsampling block to (ii-1) convert a (j+1)-st integrated feature map into a j-th up-scaled feature map having a scale identical to that of a (j+1)-st feature map, (ii-2) generate a j-th integrated feature map by calculation using the j-th up-scaled feature map and the (j+1)-st feature map, (ii-3) input the j-th integrated feature map into a (j−1)-st upsampling block, and (ii-4) generate a j-th pyramidic feature map by using the j-th integrated feature map, and (iii) repeat the processes of (i) and (ii) until the first upsampling block generates the first pyramidic feature map, resulting in the generation of a (k−1)-st pyramidic feature map to the first pyramidic feature map. Herein, the j may be an integer less than the k. Thereafter, the learning device 100 may instruct an RPN to generate each ROI corresponding to each candidate region estimated as including at least one object on each of at least two pyramidic feature maps among the k-th pyramidic feature map to the first pyramidic feature map, and may instruct a pooling layer to generate at least one feature vector by applying a pooling operation to each region, on the at least two pyramidic feature maps, corresponding to said each ROI. Then, the learning device 100 may instruct at least one FC layer to generate each piece of object class information and each piece of object regression information corresponding to said each ROI by using the feature vector, and may instruct a first loss layer to generate at least one first loss by referring to each piece of the object class information, each piece of the object regression information, and each of their corresponding first ground truths, to thereby learn at least part of parameters of the FC layer, the k-th upsampling block to the first upsampling block, and the first filter block to the n-th filter block by backpropagating the first loss.

Also, the RPN may (i) instruct its convolutional layers each of which corresponds to the at least two pyramidic feature maps to apply the convolution operations to their corresponding pyramidic feature maps, to thereby generate each piece of ROI class information and each piece of ROI regression information on each of ROI candidates corresponding to each of candidate regions estimated as including the object on the pyramidic feature maps, and (ii) instruct a proposal layer to generate said each ROI by selecting at least one specific ROI candidate having at least one high probability of including the object among the ROI candidates. Herein, the at least one high probability may be a probabilistic value higher than a pre-determined threshold. Then, the learning device 100 may instruct at least one second loss layer corresponding to the RPN to generate at least one second loss by referring to the ROI regression information, the ROI class information, and their corresponding one or more second GTs, to thereby learn parameters of the RPN by backpropagating the second loss. Herein, a temporal order of backpropagating the first loss, and backpropagating the second loss is not fixed.

Herein, the learning device 100 in accordance with one example of the present invention may be a computing device, and may be any digital device with a processor capable of computation. For reference, although FIG. 2 shows the single learning device 100, the scope of the present invention is not limited thereto. For example, the learning device may be configured as several devices to perform its functions.

Figure 3:
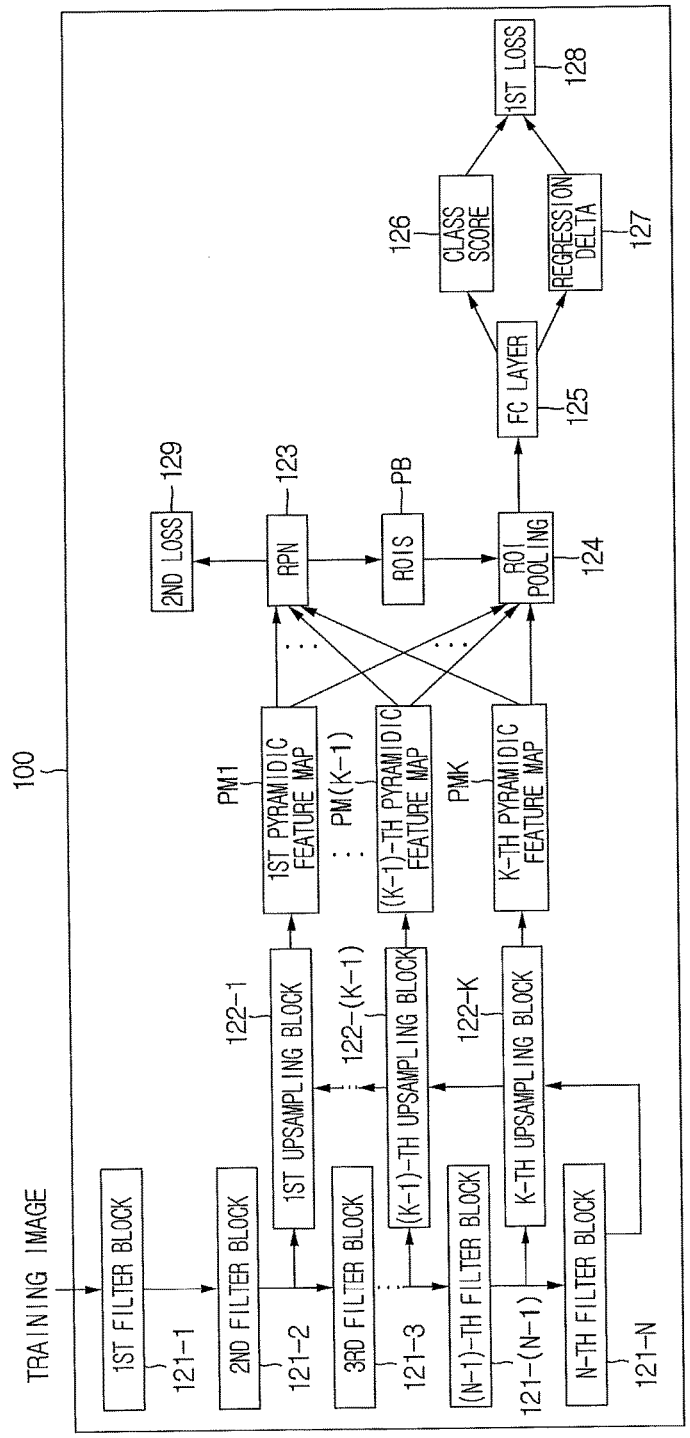
FIG. 3 is a drawing schematically illustrating a learning method for the object detector based on the R-CNN in accordance with one example embodiment of the present invention.

A method for learning parameters of the object detector based the R-CNN by using the learning device 100 in accordance with one example embodiment of the present invention is described by referring to FIG. 3 as follows.

First, if the training image is inputted, the learning device 100 may instruct the first filter block 121-1 to the n-th filter block 121-n to apply the convolution operations in sequence to the training image, to thereby generate the first feature map to the n-th feature map which are sequentially down-sampled. Herein, the first filter block 121-1 to the n-th filter block 121-n may be convolutional layers which apply the convolution operations to an image or a feature map.

Figure 4:
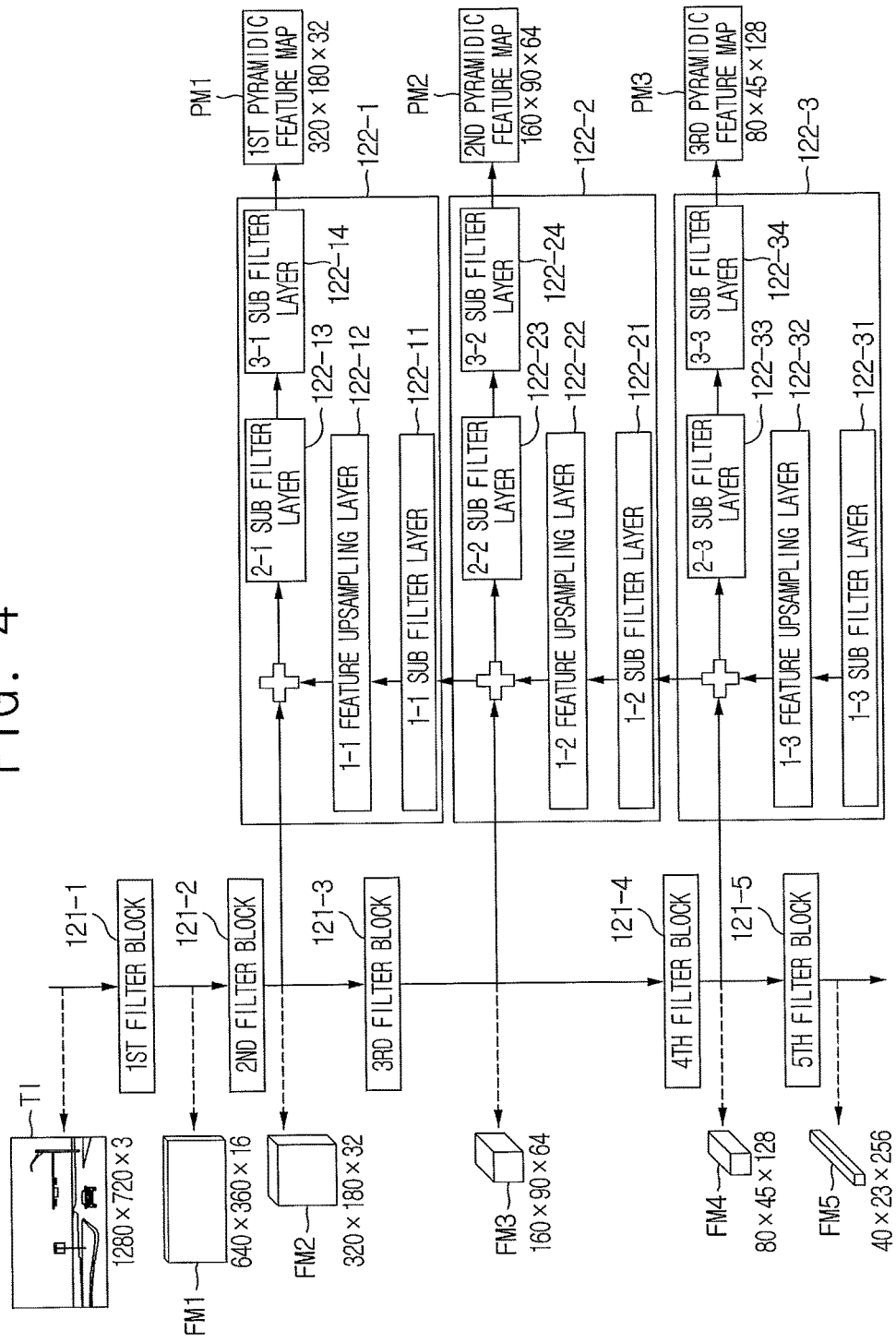
FIG. 4 is a drawing schematically illustrating a process of generating a k-th pyramidic feature map to a first pyramidic feature map in the learning method for the object detector based on the R-CNN in accordance with one example embodiment of the present invention.

As one example, by referring to FIG. 4, if a test image TI having a size of 1280×720×3, i.e., a width of 1280, a height of 720, and three channels of RGB, is inputted, the first filter block 121-1 may generate the first feature map FM1 having a size of 640×360×16 by applying the convolution operations to the test image TI, and the second filter block 121-2 may generate the second feature map FM2 having a size of 320×180×32 by applying the convolution operations to the first feature map FM1. Then, the third filter block 121-3 may generate the third feature map FM3 having a size of 160×90×64 by applying the convolution operations to the second feature map FM2, the fourth filter block 121-4 may generate the fourth feature map FM4 having a size of 80×45×128 by applying the convolution operations to the third feature map FM3, and the fifth filter block 121-5 may generate the fifth feature map FM5 having a size of 40×23×256 by applying the convolution operations to the fourth feature map FM4. Herein, FIG. 4 shows five filter blocks for convenience of explanation, but the number of the filter blocks is not limited thereto.

By referring to FIG. 3 again, the learning device 100 may instruct a k-th upsampling block 122-k to (i) convert the n-th feature map into a k-th up-scaled feature map having a scale identical to that of an (n−1)-st feature map, (ii) generate a k-th integrated feature map by calculation using the k-th up-scaled feature map and the (n−1)-st feature map, (iii) input the k-th integrated feature map into the (k−1)-st upsampling block, and (iv) generate a k-th pyramidic feature map PMk by using the k-th integrated feature map. Then, supposing that the j is an integer less than the k, the learning device 100 may (I) instruct a j-th upsampling block to (i) convert a (j+1)-st integrated feature map into a j-th up-scaled feature map having a scale identical to that of a (j+1)-st feature map, (ii) generate a j-th integrated feature map by calculation using the j-th up-scaled feature map and the (j+1)-st feature map, (iii) input the j-th integrated feature map into a (j−1)-st upsampling block, and (iv) generate a j-th pyramidic feature map by using the j-th integrated feature map, and (II) repeat the processes of generating a j-th pyramidic feature map by using a j-th integrated feature map until the first upsampling block 122-1 generates the first pyramidic feature map PM1, resulting in the generation of a (k−1)-st pyramidic feature map PM(k−1) to the first pyramidic feature map PM1.

Herein, the learning device 100 may generate the k-th integrated feature map by an element-wise operation of the k-th up-scaled feature map and the (n−1)-st feature map, and may generate the j-th integrated feature map by the element-wise operation of the j-th up-scaled feature map and the (j+1)-st feature map. Also, each of the k-th upsampling block 122-k to the first upsampling block 122-1 may (i) respectively instruct each of a (1−k)-th sub filter layer therein to a (1−1)-st sub filter layer therein to adjust each channel depth of each lower-scaled feature map to be equal to that of each upper-scaled feature map, and (ii) respectively instruct each of a (1−k)-th feature upsampling layer therein to a (1−1)-st feature upsampling layer therein respectively corresponding to the (1–k)-th sub filter layer to the (1–1)-st sub filter layer to upsample said each lower-scaled feature map, to thereby allow each size of said each lower-scaled feature map to be equal to that of said each upper-scaled feature map. Further, each of the k-th upsampling block 122-k to the first upsampling block 122-1 may (i) respectively instruct each of a (2–k)-th sub filter layer therein to a (2–1)-st sub filter layer therein to apply the convolution operations to the integrated feature maps, to thereby generate revised integrated feature maps, in order to refine each feature on the integrated feature maps by using features within a certain distance from said each feature on the integrated feature maps, and (ii) respectively instruct each of a (3–k)-th sub filter layer therein to a (3–1)-st sub filter layer therein to apply the convolution operations to the revised integrated feature maps, to thereby generate the pyramidic feature maps.

As one example, by referring to FIG. 4, a (1–3)-rd sub filter layer 122-31 of the third upsampling block 122-3 may apply the convolution operations to the fifth feature map FM5 having a size of 40×23×256 outputted from the fifth filter block 121-5, to thereby generate a feature map having a size of 40×23×128 which has a channel depth of 128 identical to that of the upper-scaled fourth feature map FM4. Herein, the (1–3)-rd sub filter layer 122-31 may be a 1×1 convolutional layer. Then, a (1–3)-rd feature upsampling layer 122-32 of the third upsampling block 122-3 may convert the feature map having a size of 40×23×128 outputted from the (1–3)-rd sub filter layer 122-31 into a feature map having a size of 80×45×128 which has a size of 80×45 identical to that of the upper-scaled fourth feature map FM4. As a result, the fifth feature map FM5 outputted from the fifth filter block 121-5 may be converted into a third up-scaled feature map having a size and a channel depth identical to those of the upper-scaled fourth feature map FM4, by the (1–3)-rd sub filter layer 122-31 and the (1–3)-rd feature upsampling layer 122-32 of the third upsampling block 122-3. However, the third up-scaled feature map may include features of the fifth feature map FM5, compared to the fourth feature map FM4 having the same scale. Thereafter, the third upsampling block 122-3 may generate a third integrated feature map having a size of 80×45×128 by the element-wise operation of the third up-scaled feature map and the fourth feature map FM4, may input the third integrated feature map into the second upsampling block 122-2, may instruct its (2–3)-rd sub filter layer 122-33 to apply the convolution operations to the third integrated feature map to refine each feature on the third integrated feature map by using features within a certain distance from said each feature on the third integrated feature map, and may instruct a (3–3)-rd sub filter layer 122-34 to apply the convolution operations to the revised third integrated feature map to refine each feature on the revised third integrated feature map by using features thereon in a direction of the channel depth, to thereby generate the third pyramidic feature map PM3. Herein, the (2–3)-rd sub filter layer 122-33 may be a 3×3 convolutional layer, and the (3–3)-rd sub filter layer 122-34 may be a 1×1 convolutional layer. Further, supposing that the (2–3)-rd sub filter layer 122-33 is the 3×3 convolutional layer, the features within a certain distance from said each feature on the third integrated feature map may be nearby features which are operands of the 3×3 convolution operations for each feature on the third integrated feature map.

Further, a (1–2)-nd sub filter layer 122-21 of the second upsampling block 122-2 may apply the convolution operations to the third integrated feature map having a size of 80×45×128 outputted from the third upsampling block 121-3, to thereby generate a feature map having a size of 80×45×64 which has a channel depth of 64 identical to that of the upper-scaled third feature map FM3. Herein, the (1–2)-nd sub filter layer 122-21 may be a 1×1 convolutional layer. Further, a (1–2)-nd feature upsampling layer 122-22 of the second upsampling block 122-2 may convert the feature map having a size of 80×45×64 outputted from the (1–2)-nd sub filter layer 122-21 into a feature map having a size of 160×90×64 which has a size of 160×90 identical to that of the upper-scaled third feature map FM3. As a result, the third integrated feature map outputted from the third upsampling block 122-3 may be converted into a second up-scaled feature map having a size and a channel depth, i.e., 160×90×64, identical to those of the upper-scaled third feature map FM3, by the (1–2)-nd sub filter layer 122-21 and by the (1–2)-nd feature upsampling layer 122-22 of the second upsampling block 122-2. However, the second up-scaled feature map may include features of the fifth feature map FM5 and the fourth feature map FM4, compared to the third feature map FM3 having the same scale. Thereafter, the second upsampling block 122-2 may generate a second integrated feature map having a size of 160×90×64 by the element-wise operation of the second up-scaled feature map and the third feature map FM3, may input the second integrated feature map into the first upsampling block 122-1, may instruct its (2–2)-nd sub filter layer 122-23 to apply the convolution operations to the second integrated feature map to refine each feature on the second integrated feature map by using features within a certain distance from said each feature on the second integrated feature map, and may instruct a (3–2)-nd sub filter layer 122-24 to apply the convolution operations to the revised second integrated feature map to refine each feature on the revised second integrated feature map by using features thereon in the direction of the channel depth, to thereby generate the second pyramidic feature map PM2 having a size of 160× 90×64. Herein, the (2–2)-nd sub filter layer 122-23 may be a 3×3 convolutional layer, and the (3–2)-nd sub filter layer 122-24 may be a 1×1 convolutional layer.

Thereafter, a (1–1)-st sub filter layer 122-11 of the first upsampling block 122-1 may apply the convolution operations to the second integrated feature map having a size of 160×90×64 outputted from the second upsampling block 122-2, to thereby generate a feature map having a size of 160×90×32 which has a channel depth of 32 identical to that of the upper-scaled second feature map FM2. Herein, the (1–1)-st sub filter layer 122-11 may be a 1×1 convolutional layer. Then, a (1–1)-st feature upsampling layer 122-12 of the first upsampling block 122-1 may convert the feature map having a size of 160×90×32 outputted from the (1–1)-st sub filter layer 122-11 into a feature map having a size of 320×180×32 which has a size of 320×180 identical to that of the upper-scaled second feature map FM2. As a result, the second integrated feature map outputted from the second upsampling block 122-2 may be converted into a first up-scaled feature map having a size and a channel depth, i.e., 320×180×32, identical to those of the upper-scaled second feature map FM2, by the (1–1)-st sub filter layer 122-11 and by the (1–1)-st feature upsampling layer 122-12 of the first upsampling block 122-1. However, the first up-scaled feature map may include features of the fifth feature map FM5, the fourth feature map FM4, and the third feature map FM3, compared to the second feature map FM2 having the same scale. Thereafter, the first upsampling block 122-1 may generate a first integrated feature map having a size of 320×180×32 by the element-wise operation of the first up-scaled feature map and the third feature map FM3, may instruct its (2-1)-st sub filter layer 122-13 to apply the convolution operations to the first integrated feature map to refine each feature on the first integrated feature map by using features within a certain distance from said each feature on the first integrated feature map, and may instruct a (3-1)-st sub filter layer 122-14 to apply the convolution operations to the revised first integrated feature map to refine each feature on the revised first integrated feature map by using features thereon in the direction of the channel depth, to thereby generate the first pyramidic feature map PM1 having a size of 320×180×32. Herein, the (2-1)-st sub filter layer 122-13 may be a 3×3 convolutional layer, and the (3-1)-st sub filter layer 122-14 may be a 1×1 convolutional layer.

Although FIG. 4 illustrates the third upsampling block to the first upsampling block, this is for convenience of explanation. For example, the number of the upsampling blocks may vary according to the number of the filter blocks. Especially, the scale of the pyramidic feature map outputted from the first upsampling block is described as corresponding to the scale of the feature map outputted from the second filter block, however, the number of the upsampling blocks may be adjusted such that the scale of the pyramidic feature map outputted from the first upsampling block corresponds to the scale of the first feature map outputted from the first filter block.

Next, by referring to FIG. 3 again, after the k-th pyramidic feature map PMk to the first pyramidic feature map PM1 are generated, the learning device 100 may instruct the RPN 123 to generate each of proposal boxes PB for each ROI corresponding to each candidate region estimated as including at least one object on each of at least two pyramidic feature maps among the k-th pyramidic feature map PMk to the first pyramidic feature map PM1.

Herein, the RPN 123 may (i) instruct its convolutional layers each of which corresponds to the at least two pyramidic feature maps to apply the convolution operations to their corresponding pyramidic feature maps, to thereby generate each piece of ROI class information and each piece of ROI regression information of each of ROI candidates corresponding to each of candidate regions estimated as including the object on the pyramidic feature maps, and (ii) instruct the proposal layer to generate the proposal boxes PB for said each ROI by selecting at least one specific ROI candidate having at least one high probability of including the object among the ROI candidates. The at least one high probability may be a probabilistic value higher than a pre-determined threshold. Further, when the proposal layer selects the at least one specific ROI candidate among at least part of the ROI candidates corresponding to larger-scaled pyramidic feature maps and at least part of the ROI candidates corresponding to smaller-scaled pyramidic feature maps, the number of pieces of data on pixels included in the at least part of the ROI candidates corresponding to the smaller-scaled pyramidic feature maps may be equal to or greater than the number of pieces of data on pixels included in the at least part of the ROI candidates corresponding to the larger-scaled pyramidic feature maps.

Figure 5:
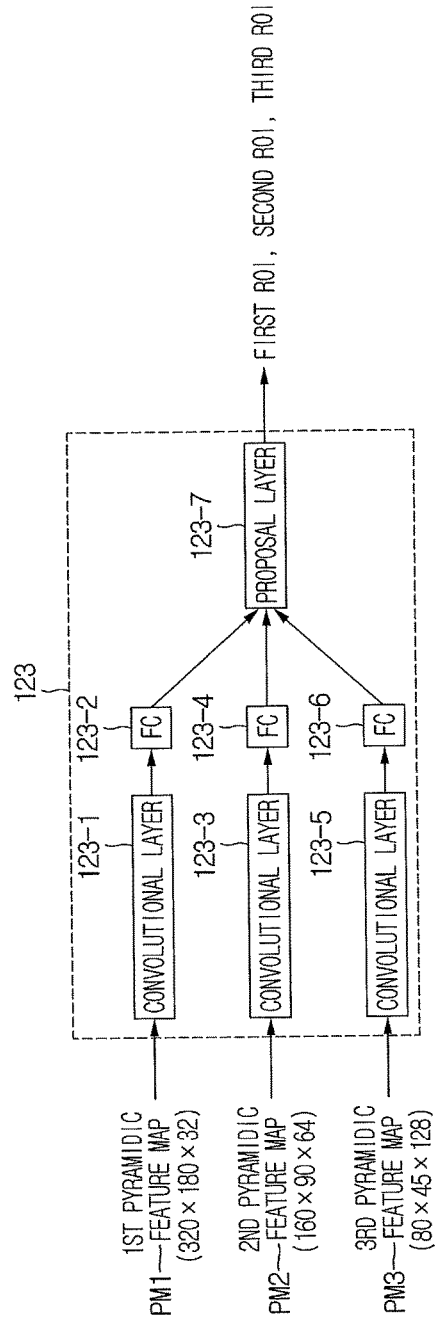
FIG. 5 is a drawing schematically illustrating a process of an RPN generating each ROI respectively corresponding to at least two pyramidic feature maps in the learning method for the object detector based on the R-CNN in accordance with one example embodiment of the present invention.

As one example, by referring to FIG. 5, (i) the RPN convolutional layer 123-1 corresponding to the first pyramidic feature map PM1 may apply the convolution operations to the first pyramidic feature map PM1 then the first RPN FC layer 123-2 may generate the ROI class information and the ROI regression information on the first ROI candidates, (ii) the RPN convolutional layer 123-3 corresponding to the second pyramidic feature map PM2 may apply the convolution operations to the second pyramidic feature map PM2 then the second RPN FC layer 123-4 may generate the ROI class information and the ROI regression information of the second ROI candidates, (iii) the RPN convolutional layer 123-5 corresponding to the third pyramidic feature map PM3 may apply the convolution operations to the third pyramidic feature map PM3 then the third RPN FC layer 123-6 may generate the ROI class information and the ROI regression information of the third ROI candidates. Then, the proposal layer 123-7 may select a first ROI, a second ROI, and a third ROI as the proposal boxes PB, corresponding to each ROI candidate having each high probability of including the object among the first ROI candidates, the second ROI candidates, and the third RIO candidates, respectively.

Next, by referring to FIG. 3, again, the learning device 100 may instruct the pooling layers 124 to generate at least one feature vector by pooling each region corresponding to said each ROI on each of the at least two pyramidic feature maps.

Figure 6:
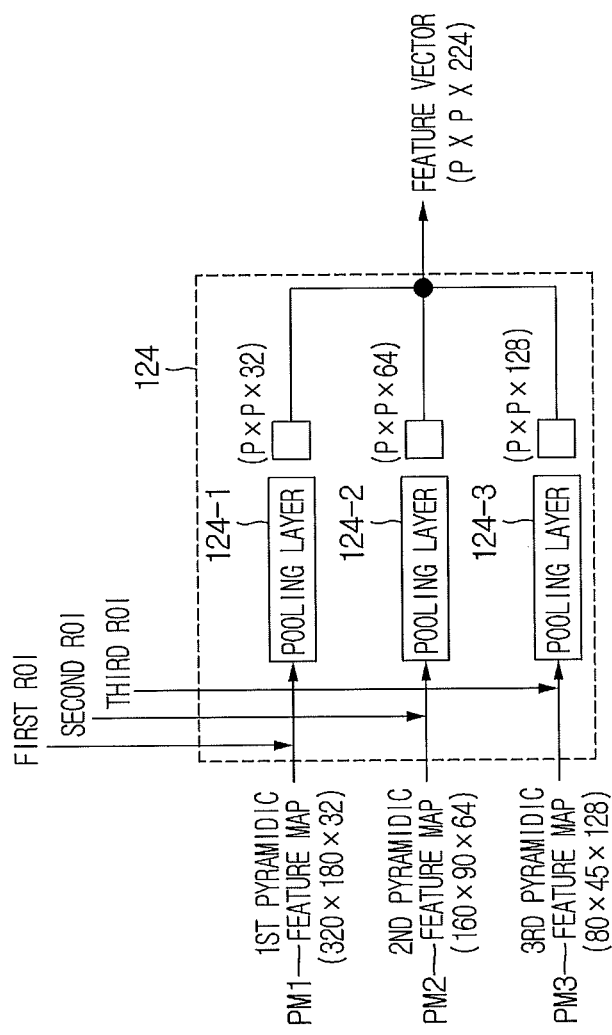
FIG. 6 is a drawing schematically illustrating a process of pooling layers generating a feature vector by pooling each region corresponding to said each ROI on each of the at least two pyramidic feature maps in the learning method for the object detector based on the R-CNN in accordance with one example embodiment of the present invention.

As one example, by referring to FIG. 6, the pooling layer 124-1 corresponding to the first ROI may apply the pooling operation to at least one region corresponding to the first ROI on the first pyramidic feature map PM1, to thereby generate a feature map having a size of P×P with a channel depth of 32, the pooling layer 124-2 corresponding to the second ROI may apply the pooling operation to at least one region corresponding to the second ROI on the second pyramidic feature map PM2, to thereby generate a feature map having a size of P×P with a channel depth of 64, and the pooling layer 124-3 corresponding to the third ROI may apply the pooling operation to at least one region corresponding to the third ROI on the third pyramidic feature map PM3, to thereby generate a feature map having a size of P×P with a channel depth of 128. Then, the pooling layers 124 may concatenate the feature map with the channel depth of 32 corresponding to the first ROI, the feature map with the channel depth of 64 corresponding to the second ROI, and the feature map with the channel depth of 128 corresponding to the third ROI, to thereby generate the feature vector with a channel depth of 224.

By referring to FIG. 3 again, the learning device 100 may instruct at least one FC layer 125 to generate each piece of object class information 126 and each piece of object regression information 127 corresponding to said each ROI by using the feature vector, and may instruct a first loss layer 128 to generate at least one first loss by referring to each piece of the object class information, each piece of the object regression information, and each of their corresponding first ground truths, to thereby learn at least part of parameters of the FC layer 125, the k-th upsampling block 122-k to the first upsampling block 122-1, and the first filter block 121-1 to the n-th filter block 122-n by backpropagating the first loss.

Further, the learning device 100 may instruct at least one second loss layer 129 corresponding to the RPN 123 to generate at least one second loss by referring to the ROI regression information, the ROI class information, and their corresponding one or more second GTs, to thereby learn the parameters of the RPN 123 by backpropagating the second loss. Herein, a temporal order of backpropagating first losses including said each object class loss and said each object regression loss, and backpropagating the second losses is not fixed.

As described above, small objects in an image are easily detected by using at least two feature maps with different upsampled scales, which further allows the total channel depth of the pooled feature vector to be smaller than that of a conventional feature vector so that no more computation is required, compared to the object detector based on the conventional R-CNN.

Figure 7:
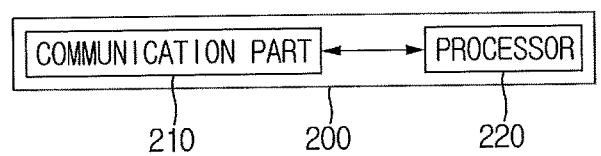
FIG. 7 is a drawing schematically illustrating a testing device for testing the object detector based on the R-CNN in accordance with one example embodiment of the present invention.

FIG. 7 is a drawing schematically illustrating a testing device 200 of the object detector based on the R-CNN in accordance with another example embodiment of the present invention, and by referring to FIG. 7, the testing device 200 may include a communication part 210 and a processor 220.

First, the communication part 210 may acquire or support another device to acquire at least one test image.

Herein, the objects detector based on the R-CNN in accordance with one example of the present invention may have been learned by the learning method described by referring to FIGS. 1 to 6.

For reference, in the description below, the phrase "for training" is added for terms related to the learning processes, and the phrase "for testing" is added for terms related to testing processes, to avoid possible confusion.

That is, the learning device may (a) if at least one training image is acquired, (i) have instructed the first filter block to the n-th filter block to apply the convolution operations in sequence to the training image, to thereby generate the first feature map for training to the n-th feature map for training which are sequentially downsampled, (ii) have instructed the k-th upsampling block to (ii-1) convert the n-th feature map for training into a k-th up-scaled feature map for training having a scale identical to that of an (n−1)-st feature map for training, (ii-2) generate a k-th integrated feature map for training by calculation using the k-th up-scaled feature map for training and the (n−1)-st feature map for training and (ii-3) input the k-th integrated feature map for training into the (k−1)-st upsampling block, and (ii-4) generate a k-th pyramidic feature map for training by using the k-th integrated feature map for training, and (iii) have instructed a j-th upsampling block to (iii-1) convert a (j+1)-st integrated feature map for training into a j-th up-scaled feature map for training having a scale identical to that of a (j+1)-st feature map for training, (iii-2) generate a j-th integrated feature map for training by calculation using the j-th up-scaled feature map for training and the (j+1)-st feature map for training, (iii-3) input the j-th integrated feature map for training into a (j−1)-st upsampling block, and (iii-4) generate a j-th pyramidic feature map for training by using the j-th integrated feature map for training, and (iv) have repeated the processes of (ii) and (iii) until the first upsampling block has generated the first pyramidic feature map for training, resulting in the generation of a (k−1)-st pyramidic feature map for training to the first pyramidic feature map for training, where the j is an integer less than the k, (b) have instructed the RPN to generate each ROI for training corresponding to each candidate region estimated as including at least one object for training on each of at least two pyramidic feature maps for training among the k-th pyramidic feature map for training to the first pyramidic feature map for training, and have instructed the pooling layer to generate at least one feature vector for training by applying the pooling operation to each region, on the at least two pyramidic feature maps for training, corresponding to said each ROI for training, and (c) have instructed the FC layer to generate each piece of object class information for training and each piece of object regression information for training corresponding to said each ROI for training by using the feature vector for training, and have instructed the first loss layer to generate at least one first loss by referring to each piece of the object class information for training, each piece of the object regression information for training, and each of their corresponding first ground truths, to thereby learn at least part of the parameters of the FC layer, the k-th upsampling block to the first upsampling block, and the first filter block to the n-th filter block by backpropagating the first loss.

Next, the processor 220 may perform (a) a first process of, if at least one test image is acquired, (i) instructing the first filter block to the n-th filter block to apply the convolution operations in sequence to the test image, to thereby generate the first feature map for testing to the n-th feature map for testing which are sequentially downsampled, (ii) instructing the k-th upsampling block to (ii-1) convert the n-th feature map for testing into a k-th up-scaled feature map for testing having a scale identical to that of an (n−1)-st feature map for testing, (ii-2) generate a k-th integrated feature map for testing by calculation using the k-th up-scaled feature map for testing and the (n−1)-st feature map for testing and (ii-3) input the k-th integrated feature map for testing into the (k−1)-st upsampling block, and (ii-4) generate a k-th pyramidic feature map for testing by using the k-th integrated feature map for testing, (iii) instructing the j-th upsampling block to (iii-1) convert a (j+1)-st integrated feature map for testing into a j-th up-scaled feature map for testing having a scale identical to that of a (j+1)-st feature map for testing, (iii-2) generate a j-th integrated feature map for testing by calculation using the j-th up-scaled feature map for testing and the (j+1)-st feature map for testing, (iii-3) input the j-th integrated feature map for testing into the (j−1)-st upsampling block, and (iii-4) generate a j-th pyramidic feature map for testing by using the j-th integrated feature map for testing, and (iv) repeating the processes of (ii) and (iii) until the first upsampling block generates the first pyramidic feature map for testing, resulting in the generation of a (k−1)-st pyramidic feature map for testing to the first pyramidic feature map for testing, where the j is an integer less than the k, and (b) a second process of instructing the RPN to generate each ROI for testing corresponding to each candidate region estimated as including at least one object for testing on each of at least two pyramidic feature maps for testing among the k-th pyramidic feature map for testing to the first pyramidic feature map for testing, and instructing the pooling layer to generate at least one feature vector for testing by applying the pooling operation to each region, on the at least two pyramidic feature maps for testing, corresponding to said each ROI for testing, and (c) a third process of instructing the FC layer to generate each piece of object class information for testing and each piece of object regression information for testing corresponding to said each ROI for testing by using the feature vector for testing.

Herein, the testing device 200 in accordance with another example embodiment of the present invention may be a computing device, and may be any device with a processor capable of computation. For reference, although FIG. 7 shows the single testing device 200, the scope of the present invention is not limited thereto. For example, the testing device may be configured as several devices to perform its functions.

Figure 8:
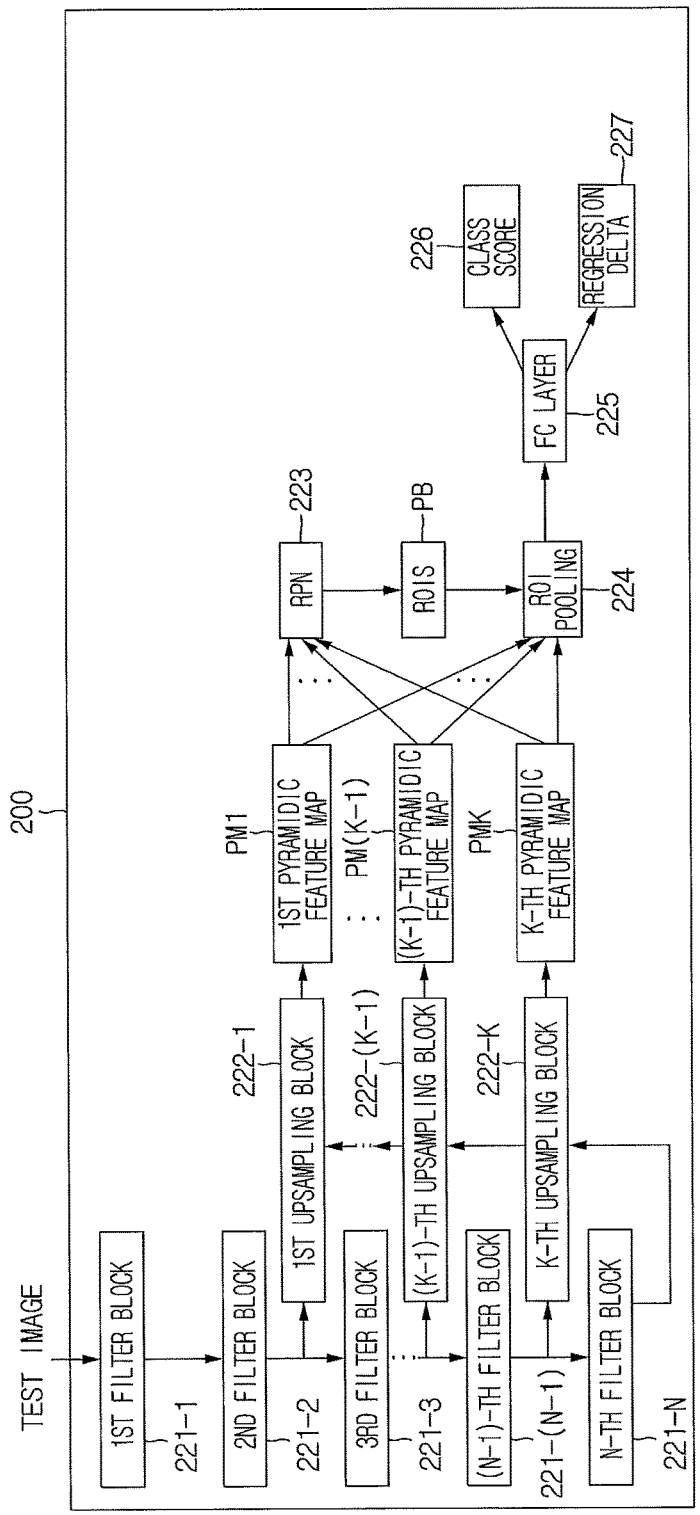
FIG. 8 is a drawing schematically illustrating a testing method for the object detector based on the R-CNN in accordance with one example embodiment of the present invention.

A method for learning parameters of the object detector based the R-CNN by using the testing device 200 in accordance with another example embodiment of the present invention is described by referring to FIG. 8 as follows. In the description below, the part easily deducible from the learning method described by referring to FIGS. 2 to 6 will be omitted.

First, once at least part of the parameters of the FC layer 225, the k-th upsampling block 222-k to the first upsampling block 222-1, the first filter block 221-1 to the n-th filter block 221-n, and the RPN 223 are learned by the learning method described by referring to FIGS. 2 to 6, if the test image is inputted, the testing device 200 may instruct the first filter block 221-1 to the n-th filter block 221-n to apply the convolution operations in sequence to the test image, to thereby generate the first feature map for testing to the n-th feature map for testing which are sequentially downsampled.

Next, the testing device 200 may instruct the k-th upsampling block 222-k to (i) convert the n-th feature map for testing into a k-th up-scaled feature map for testing having a scale identical to that of an (n−1)-st feature map for testing, (ii) generate a k-th integrated feature map for testing by calculation using the k-th up-scaled feature map for testing and the (n−1)-st feature map for testing, (iii) input the k-th integrated feature map for testing into the (k−1)-st upsampling block, and (iv) generate a k-th pyramidic feature map for testing by using the k-th integrated feature map for testing. Then, supposing that the j is an integer less than the k, the testing device 200 may (I) instruct the j-th upsampling block to (i) convert a (j+1)-st integrated feature map for testing into a j-th up-scaled feature map for testing having a scale identical to that of a (j+1)-st feature map for testing, (ii) generate a j-th integrated feature map for testing by calculation using the j-th up-scaled feature map for testing and the (j+1)-st feature map for testing, (iii) input the j-th integrated feature map for testing into the (j−1)-st upsampling block, and (iv) generate a j-th pyramidic feature map for testing by using the j-th integrated feature map for testing, and (II) repeat the processes of generating a j-th pyramidic feature map for testing by using a j-th integrated feature map for testing until the first upsampling block 222-1 generates the first pyramidic feature map for testing, resulting in the generation of a (k−1)-st pyramidic feature map for testing to the first pyramidic feature map for testing.

Herein, the testing device 200 may generate the k-th integrated feature map for testing by the element-wise operation of the k-th up-scaled feature map for testing and the (n−1)-st feature map for testing, and may generate the j-th integrated feature map for testing by the element-wise operation of the j-th up-scaled feature map for testing and the (j+1)-st feature map for testing. Also, each of the k-th upsampling block 222-k to the first upsampling block 222-1 may (i) respectively instruct each of the (1−k)-th sub filter layer therein to the (1−1)-st sub filter layer therein to adjust each channel depth of each lower-scaled feature map for testing to be equal to that of each upper-scaled feature map for testing, and (ii) respectively instruct each of the (1−k)-th feature upsampling layer therein to the (1−1)-st feature upsampling layer therein respectively corresponding to the (1−k)-th sub filter layer to the (1−1)-st sub filter layer to upsample said each lower-scaled feature map for testing, to thereby allow each size of said each lower-scaled feature map for testing to be equal to that of said each upper-scaled feature map for testing. Further, each of the k-th upsampling block 222-k to the first upsampling block 222-1 may (i) respectively instruct each of the (2−k)-th sub filter layer therein to the (2−1)-st sub filter layer therein to apply the convolution operations to the integrated feature maps for testing, to thereby generate revised integrated feature maps for testing, in order to refine each feature for testing on the integrated feature maps for testing by using features within a certain distance from said each feature for testing on the integrated feature maps for testing, and (ii) respectively instruct each of the (3−k)-th sub filter layer therein to the (3−1)-st sub filter layer therein to apply the convolution operations to the revised integrated feature maps for testing in order to refine each feature for testing on the revised integrated feature maps for testing by using features in the direction of the channel depth, to thereby generate the pyramidic feature maps for testing.

Next, after the k-th pyramidic feature map for testing to the first pyramidic feature map for testing are generated, the testing device 200 may instruct the RPN 223 to generate each of proposal boxes for testing for each ROI corresponding to each candidate region estimated as including the object on each of at least two pyramidic feature maps for testing among the k-th pyramidic feature map for testing to the first pyramidic feature map for testing.

Herein, the RPN 223 may (i) instruct its convolutional layers each of which corresponds to the at least two pyramidic feature maps for testing to apply the convolution operations to their corresponding pyramidic feature maps for testing, to thereby generate each piece of ROI class information for testing and each piece of ROI regression information for testing of each of ROI candidates for testing corresponding to each of candidate regions estimated as including the object on the pyramidic feature maps for testing, and (ii) instruct the proposal layer to generate the proposal boxes for testing for said each ROI for testing by selecting at least one specific ROI candidate for testing having at least one high probability of including the object among the ROI candidates for testing. The at least one high probability may be a probabilistic value higher than a pre-determined threshold. Further, when the proposal layer selects the at least one specific ROI candidate for testing among at least part of the ROI candidates for testing corresponding to larger-scaled pyramidic feature maps for testing and at least part of the ROI candidates for testing corresponding to smaller-scaled pyramidic feature maps for testing, the number of pieces of data on pixels included in the at least part of the ROI candidates for testing corresponding to the smaller-scaled pyramidic feature maps for testing may be equal to or greater than the number of pieces of data on pixels included in the at least part of the ROI candidates for testing corresponding to the larger-scaled pyramidic feature maps for testing.

Next, the testing device 200 may instruct the pooling layers 224 to generate at least one feature vector for testing by pooling each region corresponding to said each ROI for testing on each of the at least two pyramidic feature maps for testing.

Next, the testing device 200 may instruct the FC layer 225 to generate object regression information 227 for testing and object class information 226 for testing corresponding to said each of the ROI for testing by using the feature vector for testing, to thereby detect the object in the test image.

As described above, small objects in an image are easily detected by using at least two feature maps for testing with different upsampled scales, which further allows the total channel depth of the pooled feature vector for testing to be smaller than that of a conventional feature vector for testing so that no more computation is required compared to the object detector based on the conventional R-CNN.

The present invention has an effect of detecting small objects in an image with a small number of pixel data with ease, by upsampling a feature map scaled down from the convolution operations, and by using multiple upsampled feature maps.

The present invention has another effect of detecting small objects in an image with ease by using at least two feature maps with different upsampled scales.

The present invention has still another effect of detecting small objects in an image with ease by allowing the total channel depth of the pooled feature vector to be smaller than that of a conventional feature vector so that no more computation is required, compared to the object detector based on the conventional R-CNN.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning an object detector based on an R-CNN (Region-based CNN) by using each of a first filter block to an n-th filter block respectively generating each of a first feature map to an n-th feature map through one or more convolution operations in sequence, and a k-th upsampling block to a first upsampling block respectively coupled with at least part of the first filter block to the n-th filter block, comprising steps of:
(a) a learning device, if at least one training image is acquired, (i) instructing the first filter block to the n-th filter block to apply the convolution operations in sequence to the training image, to thereby generate the first feature map to the n-th feature map which are sequentially downsampled, wherein n is an integer, (ii) instructing the k-th upsampling block to (ii-1) convert the n-th feature map into a k-th up-scaled feature map having a scale identical to that of an (n−1)-st feature map, (ii-2) generate a k-th integrated feature map by calculation using the k-th up-scaled feature map and the (n−1)-st feature map and (ii-3) input the k-th integrated feature map into the (k−1)-st upsampling block, and (ii-4) generate a k-th pyramidic feature map by using the k-th integrated feature map, wherein k is an integer less than or equal to n, and (iii) instructing a j-th upsampling block to (iii-1) convert a (j+1)-st integrated feature map into a j-th up-scaled feature map having a scale identical to that of a (j+1)-st feature map, (iii-2) generate a j-th integrated feature map by calculation using the j-th up-scaled feature map and the (j+1)-st feature map, (iii-3) input the j-th integrated feature map into a (j−1)-st upsampling block, and (iii-4) generate a j-th pyramidic feature map by using the j-th integrated feature map, and (iv) repeating the processes of (ii) and (iii) until the first upsampling block generates the first pyramidic feature map, resulting in the generation of a (k−1)-st pyramidic feature map to the first pyramidic feature map, wherein the j is an integer less than the k;
(b) the learning device instructing an RPN (Region Proposal Network) to generate each ROI (Region of Interest) corresponding to each candidate region estimated as including at least one object on each of at least two pyramidic feature maps among the k-th pyramidic feature map to the first pyramidic feature map, and instructing a pooling layer to generate at least one feature vector by applying a pooling operation to each region, on the at least two pyramidic feature maps, corresponding to said each ROI; and
(c) the learning device instructing at least one FC (Fully Connected) layer to generate each piece of object class information and each piece of object regression information corresponding to said each ROI by using the feature vector, and instructing a first loss layer to generate at least one first loss by referring to each piece of the object class information, each piece of the object regression information, and each of their corresponding first ground truths (GTs), to thereby learn at least part of parameters of the FC layer, the k-th upsampling block to the first upsampling block, and the first filter block to the n-th filter block by backpropagating the first loss.

2. The method of claim 1, wherein each of the k-th upsampling block to the first upsampling block (i) respectively instructs each of a (1−k)-th sub filter layer therein to a (1−1)-st sub filter layer therein to adjust each channel depth of each lower-scaled feature map to be equal to that of each upper-scaled feature map, and (ii) respectively instructs each of a (1−k)-th feature upsampling layer therein to a (1−1)-st feature upsampling layer therein respectively corresponding to the (1−k)-th sub filter layer to the (1−1)-st sub filter layer to upsample said each lower-scaled feature map, to thereby allow a size of said each lower-scaled feature map to be equal to that of said each upper-scaled feature map.

3. The method of claim 1, wherein each of the k-th upsampling block to the first upsampling block (i) respectively instructs each of a (2−k)-th sub filter layer therein to a (2−1)-st sub filter layer therein to apply the convolution operations to the integrated feature maps to thereby generate revised integrated feature maps in order to refine each feature on the integrated feature maps by using features within a certain distance from said each feature on the integrated feature maps, and (ii) respectively instructs each of a (3−k)-th sub filter layer therein to a (3−1)-st sub filter layer therein to apply the convolution operations to the revised integrated feature maps in order to refine each feature on the revised integrated feature maps by using features in a direction of the channel depth, to thereby generate the pyramidic feature maps.

4. The method of claim 1, wherein, at the step of (b), the RPN (i) instructs its convolutional layers each of which corresponds to the at least two pyramidic feature maps to apply the convolution operations to their corresponding pyramidic feature maps, to thereby generate each piece of ROI class information and each piece of ROI regression information of each of ROI candidates corresponding to each of candidate regions estimated as including the object on the pyramidic feature maps, and (ii) instructs a proposal layer to generate said each ROI by selecting at least one specific ROI candidate having at least one high probability of including the object among the ROI candidates.

5. The method of claim 4, wherein the learning device instructs at least one second loss layer corresponding to the RPN to generate at least one second loss by referring to the ROI regression information, the ROI class information, and their corresponding one or more second GTs, to thereby learn parameters of the RPN by backpropagating the second loss.

6. The method of claim 4, wherein, at the step of (b), when the proposal layer selects the at least one specific ROI candidate among at least part of the ROI candidates corresponding to larger-scaled pyramidic feature maps and at least part of the ROI candidates corresponding to smaller-scaled pyramidic feature maps, the number of pieces of data on pixels included in the at least part of the ROI candidates corresponding to the smaller-scaled pyramidic feature maps is equal to or greater than the number of pieces of data on pixels included in the at least part of the ROI candidates corresponding to the larger-scaled pyramidic feature maps.

7. The method of claim 1, wherein, at the step of (b), the pooling layer generates each of pooled feature maps by applying a pooling operation to each region corresponding to said each ROI on each of the pyramidic feature maps, and generates the feature vector by concatenating the pooled feature maps.

8. The method of claim 1, wherein, at the step of (a), the learning device generates the k-th integrated feature map by an element-wise operation of the k-th up-scaled feature map and the (n−1)-st feature map, and generates the j-th integrated feature map by the element-wise operation of the j-th up-scaled feature map and the (j+1)-st feature map.

9. A method for testing an object detector based on an R-CNN (Region-based CNN) by using each of a first filter block to an n-th filter block respectively generating each of a first feature map for testing to an n-th feature map for testing through one or more convolution operations in sequence, and a k-th upsampling block to a first upsampling block respectively coupled with at least part of the first filter block to the n-th filter block, comprising steps of:

(a) a testing device, on condition that a learning device (i) has instructed the first filter block to the n-th filter block to apply the convolution operations in sequence to at least one training image, to thereby generate a first feature map for training to an n-th feature map for training which are sequentially downsampled, wherein n is an integer; (ii) (ii-1) has instructed the k-th upsampling block to convert the n-th feature map for training into a k-th up-scaled feature map for training having a scale identical to that of an (n−1)-st feature map for training, (ii-2) has generated a k-th integrated feature map for training by calculation using the k-th up-scaled feature map for training and the (n−1)-st feature map for training and (ii-3) has inputted the k-th integrated feature map for training into the (k−1)-st upsampling block, and (ii-4) has generated a k-th pyramidic feature map for training by using the k-th integrated feature map for training, wherein k is an integer less than or equal to n; (iii) has instructed a j-th upsampling block to (iii-1) convert a (j+1)-st integrated feature map for training into a j-th up-scaled feature map for training having a scale identical to that of a (j+1)-st feature map for training, (iii-2) generate a j-th integrated feature map for training by calculation using the j-th up-scaled feature map for training and the (j+1)-st feature map for training, (iii-3) input the j-th integrated feature map for training into a (j−1)-st upsampling block, and (iii-4) generate a j-th pyramidic feature map for training by using the j-th integrated feature map for training; (iv) has repeated the processes of (ii) and (iii) until the first upsampling block has generated the first pyramidic feature map for training, resulting in the generation of a (k−1)-st pyramidic feature map for training to the first pyramidic feature map for training, wherein the j is an integer less than the k; (v) has instructed a RPN (Region Proposal Network) to generate each ROI (Region of Interest) for training corresponding to each candidate region estimated as including at least one object for training on each of at least two pyramidic feature maps for training among the k-th pyramidic feature map for training to the first pyramidic feature map for training; (vi) has instructed at least one pooling layer to generate at least one feature vector for training by applying at least one pooling operation to each region, on the at least two pyramidic feature maps for training, corresponding to said each ROI for training; (vii) has instructed at least one FC (Fully Connected) layer to generate each piece of object class information for training and each piece of object regression information for training corresponding to said each ROI for training by using the feature vector for training; and (viii) has instructed at least one first loss layer to generate at least one first loss by referring to each piece of the object class information for training, each piece of the object regression information for training, and each of their corresponding first ground truths (GTs), to thereby learn at least part of the parameters of the FC layer, the k-th upsampling block to the first upsampling block, and the first filter block to the n-th filter block by backpropagating the first loss; then, if at least one test image is inputted, (I) instructing the first filter block to the n-th filter block to apply the convolution operations in sequence to the test image, to thereby generate the first feature map for testing to the n-th feature map for testing which are sequentially downsampled, (II) (II-1) instructing the k-th upsampling block to convert the n-th feature map for testing into a k-th up-scaled feature map for testing having a scale identical to that of an (n−1)-st feature map for testing, (II-2) generating a k-th integrated feature map for testing by calculation using the k-th up-scaled feature map for testing and the (n−1)-st feature map for testing and (II-3) inputting the k-th integrated feature map for testing into the (k−1)-st upsampling block, and (II-4) generating a k-th pyramidic feature map for testing by using the k-th integrated feature map for testing, and (III) instructing a j-th upsampling block to (III-1) convert a (j+1)-st integrated feature map for testing into a j-th up-scaled feature map for testing having a scale identical to that of a (j+1)-st feature map for testing, (III-2) generating a j-th integrated feature map for testing by calculation using the j-th up-scaled feature map for testing and the (j+1)-st feature map for testing, (III-3) inputting the j-th integrated feature map for testing into the (j−1)-st upsampling block, and (III-4) generating a j-th pyramidic feature map for testing by using the j-th integrated feature map for testing, and (IV) repeating the processes of (II) and (III) until the first upsampling block completes generation of the first pyramidic feature map for testing, resulting in generation of a (k−1)-st pyramidic feature map for testing to the first pyramidic feature map for testing;

(b) the testing device instructing the RPN to generate each ROI for testing corresponding to each candidate region estimated as including at least one object for testing on each of at least two pyramidic feature maps for testing among the k-th pyramidic feature map for testing to the first pyramidic feature map for testing, and instructing the pooling layer to generate at least one feature vector for testing by applying the pooling operation to each region, on the at least two pyramidic feature maps for testing, corresponding to said each ROI for testing; and (c) the testing device instructing the FC layer to generate object regression information for testing and object class information for testing corresponding to said each ROI for testing by using the feature vector for testing.

10. The method of claim 9, wherein each of the k-th upsampling block to the first upsampling block (i) respectively instructs each of a (1–k)-th sub filter layer therein to a (1–1)-st sub filter layer therein to adjust each channel depth of each lower-scaled feature map for testing to be equal to that of each upper-scaled feature map for testing, and (ii) respectively instructs each of a (1–k)-th feature upsampling layer therein to a (1–1)-st feature upsampling layer therein respectively corresponding to the (1–k)-th sub filter layer to the (1–1)-st sub filter layer to upsample said each lower-scaled feature map for testing, to thereby allow a size of said each lower-scaled feature map for testing to be equal to that of said each upper-scaled feature map for testing.

11. The method of claim 9, wherein each of the k-th upsampling block to the first upsampling block (i) respectively instructs each of a (2–k)-th sub filter layer therein to a (2–1)-st sub filter layer therein to apply the convolution operations to the integrated feature maps for testing to thereby generate revised integrated feature maps for testing in order to refine each feature on the integrated feature maps for testing by using features within a certain distance from said each feature on the integrated feature maps for testing, and (ii) respectively instructs each of a (3–k)-th sub filter layer therein to a (3–1)-st sub filter layer therein to apply the convolution operations to the revised integrated feature maps for testing in order to refine each feature on the revised integrated feature maps for testing by using features in a direction of the channel depth, to thereby generate the pyramidic feature maps for testing.

12. The method of claim 9, wherein, at the step of (b), the RPN (i) instructs its convolutional layers each of which corresponds to the at least two pyramidic feature maps for testing to apply the convolution operations to their corresponding pyramidic feature maps for testing, to thereby generate each piece of ROI class information for testing and each piece of ROI regression information for testing of each of ROI candidates for testing corresponding to each of candidate regions estimated as including the object for testing on the pyramidic feature maps for testing, and (ii) instructs a proposal layer to generate said each ROI for testing by selecting at least one specific ROI candidate for testing having at least one high probability of including the object for testing among the ROI candidates for testing.

13. The method of claim 12, wherein the RPN of the learning device has instructed its corresponding at least one second loss layer to generate at least one second loss by referring to the ROI regression information for training, the ROI class information for training, and their corresponding one or more second GTs, to thereby learn parameters of the RPN of the learning device by backpropagating the second loss.

14. The method of claim 9, wherein, at the step of (b), the pooling layer generates each of pooled feature maps for testing by applying the pooling operation to each region corresponding to said each ROI for testing on each of the pyramidic feature maps for testing, and generates the feature vector for testing by concatenating the pooled feature maps for testing.

15. The method of claim 9, wherein, at the step of (a), the testing device generates the k-th integrated feature map for testing by an element-wise operation of the k-th up-scaled feature map for testing and the (n–1)-st feature map for testing, and generates the j-th integrated feature map for testing by the element-wise operation of the j-th up-scaled feature map for testing and the (j+1)-st feature map for testing.

16. A learning device for learning an object detector based on an R-CNN (Region-based CNN) by using each of a first filter block to an n-th filter block respectively generating each of a first feature map to an n-th feature map through one or more convolution operations in sequence, and a k-th upsampling block to a first upsampling block respectively coupled with at least part of the first filter block to the n-th filter block, comprising:

a processor for performing processes of (I) instructing the first filter block to the n-th filter block to apply the convolution operations in sequence to at least one acquired training image, to thereby generate the first feature map to the n-th feature map which are sequentially downsampled, wherein n is an integer, (II) instructing the k-th upsampling block to (II-1) convert the n-th feature map into a k-th up-scaled feature map having a scale identical to that of an (n–1)-st feature map, (II-2) generate a k-th integrated feature map by calculation using the k-th up-scaled feature map and the (n–1)-st feature map and (II-3) input the k-th integrated feature map into the (k–1)-st upsampling block, and (II-4) generate a k-th pyramidic feature map by using the k-th integrated feature map, wherein k is an integer less than or equal to n, and (III) instructing a j-th upsampling block to (III-1) convert a (j+1)-st integrated feature map into a j-th up-scaled feature map having a scale identical to that of a (j+1)-st feature map, (III-2) generate a j-th integrated feature map by calculation using the j-th up-scaled feature map and the (j+1)-st feature map, (III-3) input the j-th integrated feature map into a (j–1)-st upsampling block, and (III-4) generate a j-th pyramidic feature map by using the j-th integrated feature map, (IV) repeating the processes of (II) and (III) until the first upsampling block generates the first pyramidic feature map, resulting in the generation of a (k–1)-st pyramidic feature map to the first pyramidic feature map, wherein the j is an integer less than the k, (V) instructing an RPN (Region Proposal Network) to generate each ROI (Region of Interest) corresponding to each candidate region estimated as including at least one object on each of at least two pyramidic feature maps among the k-th pyramidic feature map to the first pyramidic feature map, and instructing a pooling layer to generate at least one feature vector by applying a pooling operation to each region, on the at least two pyramidic feature maps, corresponding to said each ROI, and (VI) instructing at least one FC (Fully Connected) layer to generate each piece of object class information and each piece of object regression information corresponding to said each ROI by using the feature vector, and instructing a first loss layer to generate at least one first loss by referring to each piece of the object class information, each piece of the object regression information, and each of their corresponding first ground truths (GTs), to thereby learn at least part of parameters of the FC layer, the k-th upsampling block to the first upsampling block, and the first filter block to the n-th filter block by backpropagating the first loss.

17. The learning device of claim 16, wherein each of the k-th upsampling block to the first upsampling block (i) respectively instructs each of a (1-k)-th sub filter layer therein to a (1-1)-st sub filter layer therein to adjust each channel depth of each lower-scaled feature map to be equal to that of each upper-scaled feature map, and (ii) respectively instructs each of a (1-k)-th feature upsampling layer therein to a (1-1)-st feature upsampling layer therein respectively corresponding to the (1-k)-th sub filter layer to the (1-1)-st sub filter layer to upsample said each lower-scaled feature map, to thereby allow a size of said each lower-scaled feature map to be equal to that of said each upper-scaled feature map.

18. The learning device of claim 16, wherein each of the k-th upsampling block to the first upsampling block (i) respectively instructs each of a (2-k)-th sub filter layer therein to a (2-1)-st sub filter layer therein to apply the convolution operations to the integrated feature maps to thereby generate revised integrated feature maps in order to refine each feature on the integrated feature maps by using features within a certain distance from said each feature on the integrated feature maps, and (ii) respectively instructs each of a (3-k)-th sub filter layer therein to a (3-1)-st sub filter layer therein to apply the convolution operations to the revised integrated feature maps in order to refine each feature on the revised integrated feature maps by using features in a direction of the channel depth, to thereby generate the pyramidic feature maps.

19. The learning device of claim 16, wherein, at the process of (V), the RPN (i) instructs its convolutional layers each of which corresponds to the at least two pyramidic feature maps to apply the convolution operations to their corresponding pyramidic feature maps, to thereby generate each piece of ROI class information and each piece of ROI regression information of each of ROI candidates corresponding to each of candidate regions estimated as including the object on the pyramidic feature maps, and (ii) instructs a proposal layer to generate said each ROI by selecting at least one specific ROI candidate having at least one high probability of including the object among the ROI candidates.

20. The learning device of claim 19, wherein the processor instructs at least one second loss layer corresponding to the RPN to generate at least one second loss by referring to the ROI regression information, the ROI class information, and their corresponding one or more second GTs, to thereby learn parameters of the RPN by backpropagating the second loss.

21. The learning device of claim 19, wherein, at the process of (V), when the proposal layer selects the at least one specific ROI candidate among at least part of the ROI candidates corresponding to larger-scaled pyramidic feature maps and at least part of the ROI candidates corresponding to smaller-scaled pyramidic feature maps, the number of pieces of data on pixels included in the at least part of the ROI candidates corresponding to the smaller-scaled pyramidic feature maps is equal to or greater than the number of pieces of data on pixels included in the at least part of the ROI candidates corresponding to the larger-scaled pyramidic feature maps.

22. The learning device of claim 16, wherein, at the process of (V), the pooling layer generates each of pooled feature maps by applying a pooling operation to each region corresponding to said each ROI on each of the pyramidic feature maps, and generates the feature vector by concatenating the pooled feature maps.

23. The learning device of claim 16, wherein, at the processes of (II) to (III), the processor generates the k-th integrated feature map by an element-wise operation of the k-th up-scaled feature map and the (n-1)-st feature map, and generates the j-th integrated feature map by the element-wise operation of the j-th up-scaled feature map and the (j+1)-st feature map.

24. A testing device for testing an object detector based on an R-CNN (Region-based CNN) by using each of a first filter block to an n-th filter block respectively generating each of a first feature map for testing to an n-th feature map for testing through one or more convolution operations in sequence, and a k-th upsampling block to a first upsampling block respectively coupled with at least part of the first filter block to the n-th filter block, comprising:
a processor for performing processes of (I) instructing the first filter block to the n-th filter block to apply the convolution operations in sequence to the test image, to thereby generate the first feature map for testing to the n-th feature map for testing which are sequentially downsampled, the at least one test image acquired on condition that a learning device (i) has instructed the first filter block to the n-th filter block to apply the convolution operations in sequence to at least one training image, to thereby generate a first feature map for training to an n-th feature map for training which are sequentially downsampled, wherein n is an integer; (ii) (ii-1) has instructed the k-th upsampling block to convert the n-th feature map for training into a k-th up-scaled feature map for training having a scale identical to that of an (n-1)-st feature map for training, (ii-2) has generated a k-th integrated feature map for training by calculation using the k-th up-scaled feature map for training and the (n-1)-st feature map for training and (ii-3) has inputted the k-th integrated feature map for training into the (k-1)-st upsampling block, and (ii-4) has generated a k-th pyramidic feature map for training by using the k-th integrated feature map for training, wherein k is an integer less than or equal to n; (iii) has instructed a j-th upsampling block to (iii-1) convert a (j+1)-st integrated feature map for training into a j-th up-scaled feature map for training having a scale identical to that of a (j+1)-st feature map for training, (iii-2) generate a j-th integrated feature map for training by calculation using the j-th up-scaled feature map for training and the (j+1)-st feature map for training, (iii-3) input the j-th integrated feature map for training into a (j-1)-st upsampling block, and (iii-4) generate a j-th pyramidic feature map for training by using the j-th integrated feature map for training; (iv) has repeated the processes of (ii) and (iii) until the first upsampling block has generated the first pyramidic feature map for training, resulting in the generation of a (k-1)-st pyramidic feature map for training to the first pyramidic feature map for training, wherein the j is an integer less than the k; (v) has instructed a RPN (Region Proposal Network) to generate each ROI (Region of Interest) for training corresponding to each candidate region estimated as including at least one object for training on each of at least two pyramidic feature maps for training among the k-th pyramidic feature map for training to the first pyramidic feature map for training; (vi) has instructed at least one pooling layer to generate at least one feature vector for training by applying at least one pooling operation to each region, on the at least two pyramidic feature maps for training, corresponding to said each ROI for training; (vii) has instructed at least one FC (Fully Connected) layer to generate each piece of object class information for training and each piece of object regression information for training corresponding to said each ROI for training by using the feature vector for training; and (viii) has instructed at least one first loss layer to generate at least one first loss by referring to each piece of the object class information for training, each piece of the object regression information for training, and each of their corresponding first ground truths (GTs), to thereby learn at least part of the parameters of the FC layer, the k-th upsampling block to the first upsampling block, and the first filter block to the n-th filter block by backpropagating the first loss;

(II) (II-1) instructing the k-th upsampling block to convert the n-th feature map for testing into a k-th up-scaled feature map for testing having a scale identical to that of an (n−1)-st feature map for testing, (II-2) generating a k-th integrated feature map for testing by calculation using the k-th up-scaled feature map for testing and the (n−1)-st feature map for testing and (II-3) inputting the k-th integrated feature map for testing into the (k−1)-st upsampling block, and (II-4) generating a k-th pyramidic feature map for testing by using the k-th integrated feature map for testing, and (III) instructing a j-th upsampling block to (III-1) convert a (j+1)-st integrated feature map for testing into a j-th up-scaled feature map for testing having a scale identical to that of a (j+1)-st feature map for testing, (III-2) generating a j-th integrated feature map for testing by calculation using the j-th up-scaled feature map for testing and the (j+1)-st feature map for testing, (III-3) inputting the j-th integrated feature map for testing into the (j−1)-st upsampling block, and (III-4) generating a j-th pyramidic feature map for testing by using the j-th integrated feature map for testing, (IV) repeating the processes of (II) and (III) until the first upsampling block completes generation of the first pyramidic feature map for testing, resulting in generation of a (k−1)-st pyramidic feature map for testing to the first pyramidic feature map for testing, (V) instructing the RPN to generate each ROI for testing corresponding to each candidate region estimated as including at least one object for testing on each of at least two pyramidic feature maps for testing among the k-th pyramidic feature map for testing to the first pyramidic feature map for testing, and instructing the pooling layer to generate at least one feature vector for testing by applying the pooling operation to each region, on the at least two pyramidic feature maps for testing, corresponding to said each ROI for testing, and (VI) instructing the FC layer to generate object regression information for testing and object class information for testing corresponding to said each ROI for testing by using the feature vector for testing.

25. The testing device of claim 24, wherein each of the k-th upsampling block to the first upsampling block (i) respectively instructs each of a (1−k)-th sub filter layer therein to a (1−1)-st sub filter layer therein to adjust each channel depth of each lower-scaled feature map for testing to be equal to that of each upper-scaled feature map for testing, and (ii) respectively instructs each of a (1−k)-th feature upsampling layer therein to a (1−1)-st feature upsampling layer therein respectively corresponding to the (1−k)-th sub filter layer to the (1−1)-st sub filter layer to upsample said each lower-scaled feature map for testing, to thereby allow a size of said each lower-scaled feature map for testing to be equal to that of said each upper-scaled feature map for testing.

26. The testing device of claim 24, wherein each of the k-th upsampling block to the first upsampling block (i) respectively instructs each of a (2−k)-th sub filter layer therein to a (2−1)-st sub filter layer therein to apply the convolution operations to the integrated feature maps for testing to thereby generate revised integrated feature maps for testing in order to refine each feature on the integrated feature maps for testing by using features within a certain distance from said each feature on the integrated feature maps for testing, and (ii) respectively instructs each of a (3−k)-th sub filter layer therein to a (3−1)-st sub filter layer therein to apply the convolution operations to the revised integrated feature maps for testing in order to refine each feature on the revised integrated feature maps for testing by using features in a direction of the channel depth, to thereby generate the pyramidic feature maps for testing.

27. The testing device of claim 24, wherein, at the process of (V), the RPN (i) instructs its convolutional layers each of which corresponds to the at least two pyramidic feature maps for testing to apply the convolution operations to their corresponding pyramidic feature maps for testing, to thereby generate each piece of ROI class information for testing and each piece of ROI regression information for testing of each of ROI candidates for testing corresponding to each of candidate regions estimated as including the object for testing on the pyramidic feature maps for testing, and (ii) instructs a proposal layer to generate said each ROI for testing by selecting at least one specific ROI candidate for testing having at least one high probability of including the object for testing among the ROI candidates for testing.

28. The testing device of claim 27, wherein the RPN of the learning device has instructed its corresponding at least one second loss layer to generate at least one second loss by referring to the ROI regression information for training, the ROI class information for training, and their corresponding one or more second GTs, to thereby learn parameters of the RPN of the learning device by backpropagating the second loss.

29. The testing device of claim 24, wherein, at the process of (V), the pooling layer generates each of pooled feature maps for testing by applying the pooling operation to each region corresponding to said each ROI for testing on each of the pyramidic feature maps for testing, and generates the feature vector for testing by concatenating the pooled feature maps for testing.

30. The testing device of claim 24, wherein, at the processes of (II) to (III), the processor generates the k-th integrated feature map for testing by an element-wise operation of the k-th up-scaled feature map for testing and the (n−1)-st feature map for testing, and generates the j-th integrated feature map for testing by the element-wise operation of the j-th up-scaled feature map for testing and the (j+1)-st feature map for testing.

* * * * *